United States Patent
Antony

(10) Patent No.: US 7,426,455 B1
(45) Date of Patent: Sep. 16, 2008

(54) OPTIMAL BOOLEAN SET OPERATION GENERATION AMONG POLYGON-REPRESENTED REGIONS

(75) Inventor: Richard T. Antony, Washington, VA (US)

(73) Assignee: Science Applications International Corporation, San Diego, CA (US)

( * ) Notice: Subject to any disclaimer, the term of this patent is extended or adjusted under 35 U.S.C. 154(b) by 785 days.

(21) Appl. No.: 09/659,948

(22) Filed: Sep. 12, 2000

Related U.S. Application Data

(60) Provisional application No. 60/153,569, filed on Sep. 13, 1999.

(51) Int. Cl.
*G06F 7/60* (2006.01)
*G06F 17/10* (2006.01)

(52) U.S. Cl. .......................... 703/2; 345/443; 345/630; 382/226

(58) Field of Classification Search .................. 703/2; 345/443, 630; 382/226
See application file for complete search history.

(56) References Cited

U.S. PATENT DOCUMENTS

| | | | | | |
|---|---|---|---|---|---|
| 5,014,230 | A | * | 5/1991 | Sinha et al. ..................... | 703/2 |
| 5,321,613 | A | * | 6/1994 | Porter et al. .................... | 702/1 |
| 5,353,395 | A | * | 10/1994 | Tokumasu et al. ........... | 345/441 |
| 5,649,084 | A | * | 7/1997 | Ernst ........................... | 345/630 |
| 5,724,451 | A | * | 3/1998 | Shin et al. .................... | 382/240 |
| 5,751,286 | A | * | 5/1998 | Barber et al. ................ | 345/835 |
| 5,818,460 | A | * | 10/1998 | Covey et al. ................. | 345/443 |
| 5,901,245 | A | * | 5/1999 | Warnick et al. ............. | 382/190 |
| 5,924,053 | A | * | 7/1999 | Horowitz et al. ............. | 702/90 |
| 5,963,670 | A | * | 10/1999 | Lipson et al. ................ | 382/224 |
| 6,148,295 | A | * | 11/2000 | Megiddo et al. ............... | 707/3 |
| 6,292,797 | B1 | * | 9/2001 | Tuzhilin et al. ................ | 707/6 |
| 6,307,555 | B1 | * | 10/2001 | Lee ............................. | 345/423 |
| 6,466,696 | B1 | * | 10/2002 | Politis ......................... | 382/226 |

OTHER PUBLICATIONS

B. Chazelle, D.P. Dobkin; "Intersection of Convex Objects in Two and Three Dimensions", Journal of the ACM, vol. 34, No. 1, Jan. 1887, pp. 1-27.*

You-Dong Liang, Brian A. Barsky, "Analysis and Algorithm for Polygon Clipping", Communications of the ACM, vol. 26, No. 11, Nov. 1983, pp. 868-877.*

(Continued)

*Primary Examiner*—Kamini Shah
*Assistant Examiner*—Herng-der Day
(74) *Attorney, Agent, or Firm*—Kilpatrick Stockton LLP

(57) ABSTRACT

Performing Boolean operations among two regions; regions and results represented as vector tuples. Establish indexing cells about regions and classify by type of interaction between regions, e.g., (boundary, boundary). For each (boundary, boundary) cell, define pseudo-points at each boundary entrance/exit. Categorize each (boundary, boundary) cell on relationship of its pseudo-points. Identify starting points along boundaries based on: categorization, operation, and interior convention. Accumulate results cycling from a starting point, along region boundary. Upon encountering each intersection, proceed along the other region boundary. Upon encountering a cell edge, proceed along the cell edge in the direction consistent with the interior convention. Where a starting point or intersection between region boundaries remains untraversed, accumulate results in tracing a similar cycle along untraced boundaries. Discard duplicate/cell-edge only tuples. After traversing all starting points/intersections of boundaries, determine results for other cell types, and concatenate with those for (boundary, boundary) cells.

10 Claims, 19 Drawing Sheets

OTHER PUBLICATIONS

Clodoveu A. Davis Jr., Alberto H. F. Laender, "Multiple Representations in GIS : Materialization Though Map Generation, Geometric, and Spatial Analysis Operations", ACM GIS '99. pp. 60-65.*

Toshiaki Satoh, "Boolean Operations on Set Using Surface Data", 1991, ACM, pp. 119-127.*

D. Ayala, P. Brunet, R. Juan, I. Navazo, "Object Representation by Means of Nonminimal Division Quadtree and Octree", ACM Transactions on Graphics, vol. 4, No. 1, Jan. 1985, pp. 41-59.*

Ingo Wegener, "The Size of Reduced OBDD's and Optimal Read-Once Branching Programs for Almost All Boolean Functions", IEEE, vol. 43, No. 11, Nov. 1994, pp. 1262-1269.*

Randal E. Bryant, "Symbolic Boolean Manipulation with Ordered Binary Decision Diagrams", Jul. 1992.*

Randal C. Nelson, Hanan Samet, "A Consistent Hierarchical Representation for Vector Data", ACM, vol. 20, No. 4, 1986.*

Charles R. Dyer, Azriel Rosenfeld, and Hanan Samet,"Region Representation:Boundary Codes from Quadtrees", Communications of the ACM, vol. 23, No. 3, Mar. 1980, pp. 171-179.□□.*

Charles R. Dyer, Azriel Rosenfeld, and Hanan Samet,"Region Representation:Boundary Codes from Quadtrees", Communications of the ACM, vol. 23, No. 3, Mar. 1980, pp. 171-179.□□.*

Sabine Timf and Andrew U. Frank, "Using Hierarchical Spatial Data Structures for Hierarchical Spatial Reasoning", 1997, Lecture Notes in Computer Science, pp. 69-83.□□.*

James M. Sheng, Olivia R. Liu Sheng, "R-tree for Large Geographic Information Systems in a Multi-User Environment", IEEE 1990.□□.*

Hanan Samet, Robert E. Webber, "Storing a Collection of Polygons Using Quadtrees", ACM Transactions on Graphics, vol. 4, No. 3, Jul. 19885, pp. 182-222.□□.*

Richard T. Antony, "Principles of Data Fusion Automation", 1995 Artech House, Inc.*

Antony, Richard T., "Principles of Data Fusion Automation," Artech House, Inc., Copyright 1995.

Antony, R. and Emmerman, P. J., "Spatial Reasoning and Knowledge Representation," pp. 795-813, 1986.

* cited by examiner

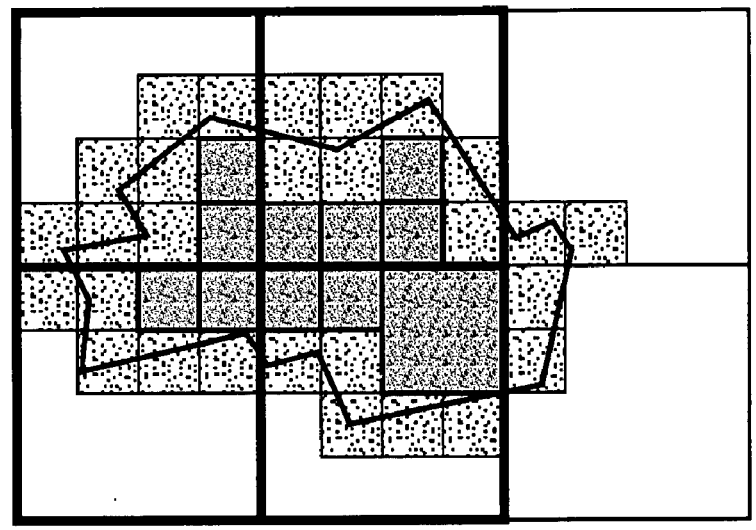
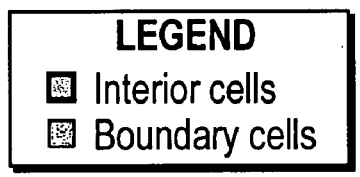
FIG. 1
*(PRIOR ART)*
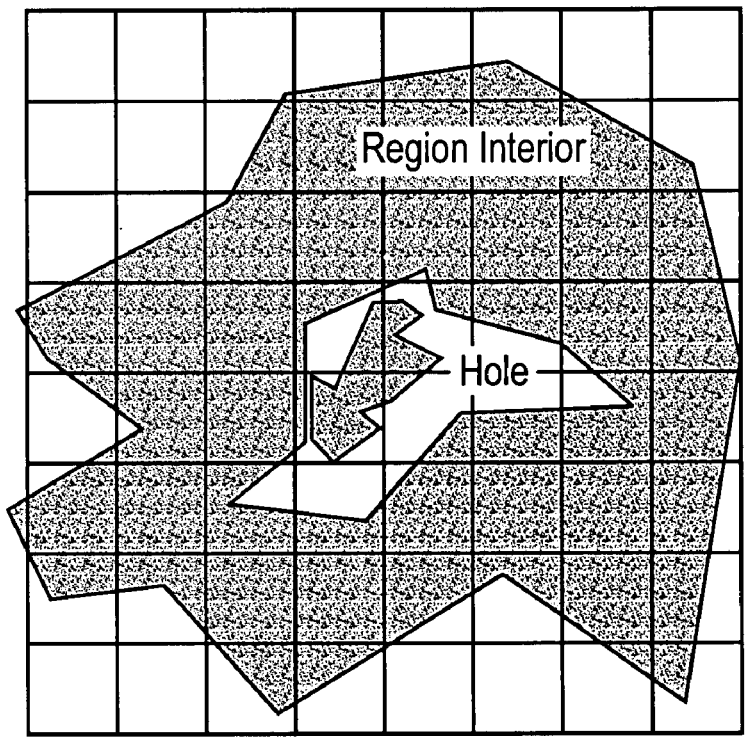
FIG. 2
*(PRIOR ART)*

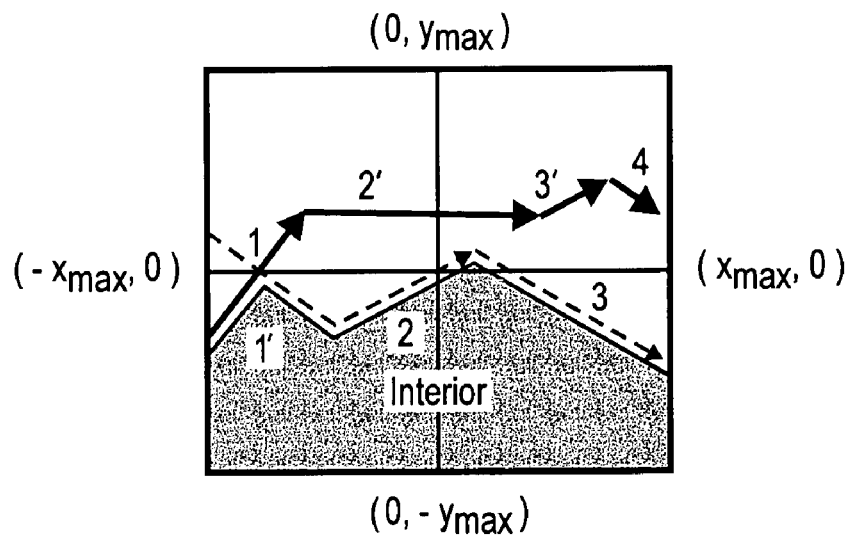

Line segment intersection cases

The two bounding boxes associated with the first two tuple-pairs from both features intersects as shown to the right

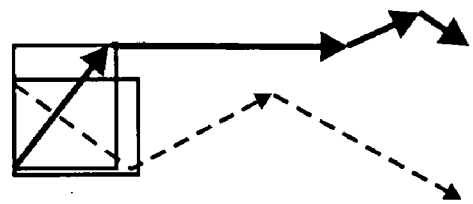

Case 1

The bounding boxes associated with the second set of tuple-pairs do not intersect

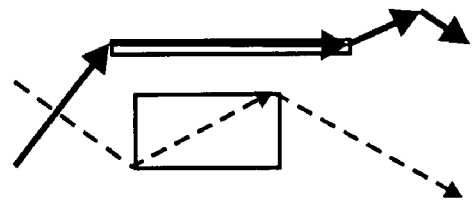

Case 2

In the case to the right, two black line segments must be elevated for intersection with a single dashed line segment

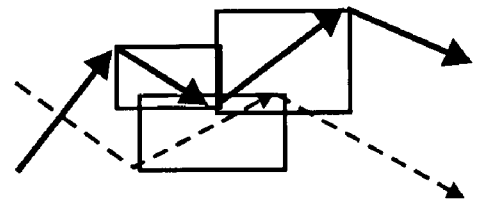

Case 3

*FIG. 8*

| Entry/Exit Relationship | Class | Begin point for first cycle (inside is " to the right ") Intersection | Begin point for first cycle (inside is " to the right ") Union | Begin point for first cycle (inside is " to the left ") Intersection | Begin point for first cycle (inside is " to the left ") Union |
|---|---|---|---|---|---|
| $D_E D_X S_E S_X$ | I | First intersection point of solid or dashed feature (<u>Null</u> if no intersect points) | Pseudo points ($S_E$ <u>and</u> $D_E$) | Pseudo points ($S_E$ <u>and</u> $D_E$) | First intersection point of solid or dashed feature (<u>Full</u> cell if no intersect points) |
| $D_E S_X S_E D_X$ | II | Pseudo points ($S_E$ <u>and</u> $D_E$) | First intersection point of solid or dashed feature (<u>Full</u> cell if no intersect points) | First intersection point of solid or dashed feature (<u>Null</u> if no intersect points) | Pseudo points ($S_E$ <u>and</u> $D_E$) |
| $D_E S_E S_X D_X$ | III | Pseudo point $S_E$ | Pseudo point $D_E$ | Pseudo point $D_E$ | Pseudo point $S_E$ |
| $D_E S_E D_X S_X$ | VI | Pseudo point $S_E$ | Pseudo point $D_E$ | Pseudo point $D_E$ | Pseudo point $S_E$ |
| $D_E D_X S_X S_E$ | IV | Pseudo point $D_E$ | Pseudo point $S_E$ | Pseudo point $S_E$ | Pseudo point $D_E$ |
| $D_E S_X D_X S_E$ | V | Pseudo point $D_E$ | Pseudo point $S_E$ | Pseudo point $S_E$ | Pseudo point $D_E$ |

Application of table:
Follow specified boundary entrance feature, accumulating intersection and/or union cycles until all polyline intersection point tuples in the cell have been exhausted.
Cycles alternate systematically along the specified entrance feature between contributions to intersection and union.
Cycles are completed when they close on themselves. The implicit boundary-closing segments of a boundary-closing cycle are not actually represented in the general product.

Comments:
As is apparent from the above formulation, intersection and union are effectively dual operations. The set operation generation procedure is similar regardless of the ordering convention of the polygon tuples (clockwise or counter-clockwise oriented), reflected in the symmetry observed within the above table.
Note that the classes are grouped into pairs. Classes I and II involve inverse operations;
Classes III and VI employ identical generation operations, as do Classes IV and V.

FIG. 15

| Entry/Exit Relationship | Class | Total # of Intersection tuples within cells | Entry/exit relationship adjacent/ alternating | Special cases # Intersect points | Total Intersect Cycles (to the right) | Total # of NOT union cycles (to the right) | Total Intersect Cycles (to the left) | Total # of NOT union cycles (to the left) |
|---|---|---|---|---|---|---|---|---|
| $D_E D_X S_E S_X$ | I | even | Adjacent | 0<br>2 | 0<br>1 | 2<br>2 | 1<br>1 | Full cell<br>2 |
| $D_E S_X S_E D_X$ | II | even | Adjacent | 0<br>2 | 1<br>2 | Full cell<br>1 | 0<br>2 | 2<br>1 |
| $D_E S_E S_X D_X$ | III | even | Adjacent | 0<br>2 | 1<br>1 | 1<br>1 | 1<br>1 | 1<br>1 |
| $D_E S_E D_X S_X$ | VI | odd | Alternating | 1 | 1 | 1 | 1 | 1 |
| $D_E D_X S_X S_E$ | IV | even | Adjacent | 0<br>2 | 1<br>1 | 1<br>1 | 1<br>1 | 1<br>1 |
| $D_E S_X D_X S_E$ | V | odd | Alternating | 1 | 1 | 1 | 1 | 1 |

FIG. 29

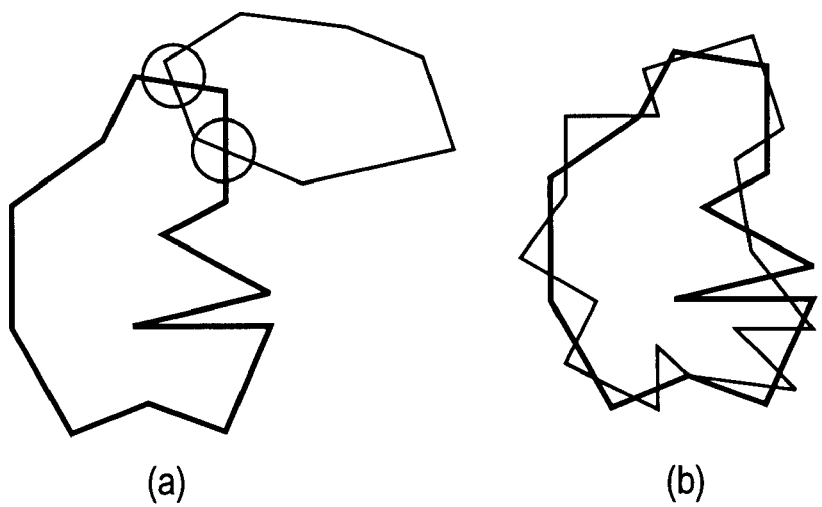

OPTIMAL BOOLEAN SET OPERATION GENERATION AMONG POLYGON-REPRESENTED REGIONS

CROSS REFERENCE TO RELATED APPLICATIONS

The present application derives priority from Provisional Patent Application No. 60/153,569 filed on 13 Sep. 1999.

BACKGROUND

1. Field of the Invention

The present invention relates to Boolean set operations on data sets and, more particularly, to an improved method and software process for Boolean set intersection and set union operations among polygon-represented data sets using a digital computer.

2. Description of Related Art

Boolean set operation generation is a foundational computational capability in a wide range of diverse problem domains, including image processing, spatial data analysis, constraint-based reasoning, earth resource evaluation, crop management, market analysis studies, micro-fabrication, mining, weather forecasting, military planning, and utility management. For example, rain forest shrinkage over time can be studied by performing Boolean set intersections between processed earth resource imagery and historical vector-represented geo-spatial map products depicting vegetation. The determination of regions "within 100 miles of Oklahoma City possessing a slope less than 3 degrees where wheat is grown" can be determined by performing Boolean set intersections between a circular region with radius 100 miles about Oklahoma City, a map product depicting slopes, and a land use product depicting agricultural crops. Ground-based target locations for military applications can often be significantly refined by intersecting sensor generated error ellipses with domain features that favor the presence of such vehicles (roads, high mobility regions, and regions that afford cover and concealment), while de-emphasizing regions that do not favor such vehicles (swamps and waterways). Each of these examples relies on Boolean set operation computation among potentially large 2-D spatially-organized data sets. All Geographic Information Systems (GIS) and modern database management systems (DBMS) provide direct support to two-dimensional Boolean set operation generation.

For polygon-represented data sets, the key Boolean set operations of intersection and union have been typically generated using algorithms from a field of mathematics known as computational geometry. Due to the highly combinatorial nature of these methods, computational requirements tend to increase rapidly as a function of the "size" of the data sets (i.e., the number of vertices in the polygon representations). Further dramatic increases in computational requirements occur when the polygons are multiply-connected (e.g., polygons with included holes or regions that consist of a collection of non-intersecting smaller regions). As a direct result of the inherent combinatorial computational requirements, large-scale dynamic applications have tended to be impractical. Even highly parallel implementations, as well as significant improvements in hardware performance cannot effectively overcome the staggering computational requirements of some prospective applications.

Traditionally, two-dimensional objects could be represented by one of two generally accepted spatial data structures: either the region quadtree or tuple-based polygon representations. The region quadtree spatial data structure provides a regular, recursive decomposition of 2-D space. Quadtrees are used in the construction of some multidimensional databases (e.g., cartography, computer graphics, and image processing). A quadtree is a means of encoding an image as a tree structure. Each node of the tree has up to four children. The root node represents the entire image; its children represent the four quadrants of the entire image; their children represent the sixteen subquadrants, and so on. Because the region quadtree is an areal-based representation, it supports highly efficient top-down spatial search and data manipulation, as well as areal-based set operation generation.

Despite these benefits, the region quadtree representation exhibits significant shortcomings. Because the "size" of the quadtree representation increases by a factor of four for each level of decomposition, excessively large storage requirements (and concomitant computational requirements) can occur for applications that demand high fidelity data representation. Tuple-based representations, on the other hand, provide memory-efficient, high fidelity representations of point, line, and region features. However, because such representations do not directly support spatial search and spatial data manipulation, data analysis tends to lead to highly combinatorial computational requirements.

Thus, both tuple-based and region quadtree-based spatial data representations possess strengths, as well as obvious weaknesses. Spatial search, reasoning, and set generation that tends to be straightforward and efficient for quadtree-based representations, but lead to computationally-intensive algorithms for tuple-based representations. Data storage requirements to support high fidelity data sets are readily met with tuple-base representations, while direct use of region quadtree representations leads to excessively large storage and associated data manipulation requirements.

There are few prior efforts at more efficient set operation generation procedures. One example, U.S. Pat. No. 5,649,084, discloses a method for performing Boolean operations on geometric objects in a computer-aided design system. Edges of a first object are intersected with surfaces of a second object to produce intersection points, and surfaces containing the faces of the two objects, respectively, are intersected with each other to produce intersection tracks. If there is an inconsistency between the intersection points and corresponding intersection tracks, a perturbation step is applied to correct the spatial positions of inconsistent intersection points. This maintains geometric consistency and avoids overly complex set operations. However, it also changes the original objects and sacrifices accuracy.

Rather than seeking incremental enhancements over traditional approaches, in the early 1980s the present inventor pioneered an entirely new data representation structure referred to as the region quadtree-indexed vector representation. See, Antony, R. and Emmerman, P., Spatial Reasoning and Knowledge Representation, Geographic Information Systems in the Government Workshop Proceedings, A. Deepak Publishing (1986). This structure helps to dramatically reduce the computational requirements for set operation generation among both simple and multiply-connected polygon-represented data sets. The quadtree-indexed vector representation is, in effect, a hybrid data structure that combines the benefits of a hierarchical, multiple resolution grid-based spatial representation (the region quadtree data structure) with the accuracy and storage efficiency of tuple-based (polygon boundary) representations. In the quadtree-indexed vector representation, the region quadtree serves not only as a spatial indexing mechanism into memory-efficient, high fidelity representations of points, lines, and region boundaries, but as a multiple resolution spatial representation in its own right.

FIG. 1 illustrates the relationship between an indexing cell(s) and the underlying tuple-based data. Note that for point and line (commonly referred to as polyline) features, every quadtree cell in the representation "indexes" tuple-based data. For regions, however, there exist two classes of quadtree indexing cells: those that index interior cells and those that index boundary cells. Interior cells are quadtree cells that are fully included within a region; boundary cells are partly within and partly outside a region. Thus, for simply-connected regions, only quadtree boundary cells associated with the region's boundary directly index tuple-based data.

For polygons that possess one or more holes as shown in FIG. 2, tuple lists define not only the outer boundary of the polygon, but also the boundaries of all included holes. The tuple list of a hole serves both as the description of the edge of the hole, as well as a description of an inner edge of the region. The "direction" associated with the tuple list of a first-order hole is opposite that of the outer boundary list convention. For embedded holes, each subsequent tuple list is order-reversed to maintain logical consistency with respect to the "inside" and "outside" of the region.

FIG. 3 illustrates tuple-represented piece-wise continuous line feature representing a region boundary along with the associated quadtree-indexing cells. This figure shows the association between line segment vertex tuples and the quadtree-indexing cell (actual data points are shown as filled circles; pseudo points are shown as open circles). The outer square in the figure represents an indexing cell at some arbitrary level of decomposition. Data points 2, 3, 4, 5, and 10 are seen to lie within the cell. The quadtree-indexed vector spatial data structure requires the addition of pseudo points at all cell entrance and exit boundaries. Referring back to FIG. 3, four pseudo points are associated with this particular cell: points 1, 6, 9, and 11. If represented at the next higher resolution quadtree grid size (indicated by the four smaller squares in FIG. 3), additional pseudo points are required at the boundaries of the smaller indexing cells. For example, the upper right indexing cell consists of the entrance tuple pseudo point 3', the data tuples 4 and 5, and the exit tuple pseudo point 6. Because one or more data tuples could fall on a cell boundary (a data tuple actually lies at the cell boundary or a line segment follows the cell boundary), the implementation must distinguish pseudo points from the original tuple list. Adjacent cells maintain duplicate shared cell boundary tuples. The lower right and the upper right cells, for example, share tuple 3'.

In addition to distinguishing between data point tuples and indexing cell boundary pseudo points, the implementation must distinguish between interior (non-boundary) indexing cells and boundary indexing cells.

FIGS. 4(*a*)-(*c*) shows the interaction between two regions, and FIGS. 4(*d*)-(*f*) shows the interaction between the region's respective quadtree grids. Unless two regions share at least one common quadtree indexing cell, no direct interaction between the two data sets occur. When no common cells occur, set intersection is null and set union is the set formed by all the cells in the two disjoint regions. However, when common cells do occur, the set intersection is as seen in FIG. 4(*f*).

FIG. 5 illustrates a categorical approach for analyzing set operations that was developed by the inventor herein and is described in Antony, R., Principles of Data Fusion Automation (Artech House, 1995). When set intersection exists, set operation generation is treated as a three-stage (sub-problem) process involving the following canonical form classes.

Class 1: interactions between two interior cells;
Class 2: interactions between a boundary and an interior cell; and
Class 3: interactions between two boundary cells.

The first two stages entail only relatively trivial computations, and the appropriate methods for generating the products from both Class 1 and Class 2 are described in the Antony treatise, supra at 95. The third stage, however, is considerably more involved and effectively controls the computational complexity of the set operation generation process. Because both polylines and points can be treated as degenerate regions (regions with no "interior cells"), set union and intersection operations for these lower order features can be treated as a special case of the region generation methodology.

Consequently, it would be greatly advantageous to provide an optimal method for generating the product of the third, and key stage of the procedure: Class 3 interactions between two boundary cells.

SUMMARY OF THE INVENTION

It is, therefore, an object of the present invention to provide an improved method for generating Boolean set intersection and set union among polygon-represented data sets using a digital computer.

It is another object to provide a method as described above which is computationally superior to current computational geometry methods, giving orders of magnitude improvement in efficiency over current computational methods.

It is another object to provide a method of Boolean set operations that fully capitalizes on the efficiencies gained by quadtree-indexed vector representation of "tuple-based lists" that define region(s) associated with the union and intersection of the original data sets.

According to the present invention, the above-described and other objects are accomplished by providing a method and software implementation for computing Boolean set operations on two regions defined by a quadtree-indexed vector representation of data point tuples. The method steps initially include establishing indexing cells about the two regions.

Next, the method distinguishes the three canonical form classes: Class 1 interactions—indexing cells containing only interior portions of both regions (interior, interior); Class 2 interactions—indexing cells containing only interior portions of one region and boundary portions of the other region (interior, boundary); and Class 3 interactions—indexing cells containing a portion of the boundaries of both of the regions (boundary, boundary). As described above, the first two stages entail only relatively trivial computations, and the appropriate methods for generating the products from both Class 1 and Class 2 are described in the Antony treatise, supra at 95. The present method focuses on the third Class 3 which is considerably more involved and effectively controls the computational complexity of the set operation generation process.

As a next step, pseudo points are defined for each (boundary, boundary) indexing cell. Four separate pseudo points are defined for each (boundary, boundary) indexing cell, one where each of the two regions enter and exit the indexing cell.

Next, each (boundary, boundary) indexing cell is categorized based on a relationship of its defined pseudo points, and one of the two regions is selected to be a starting region for that indexing cell based on the categorization.

Given the category and starting region, the set operation is performed by including a list of tuples in each (boundary, boundary) indexing cell that are encountered while following ("tracing") the boundary of the starting region until an intersection of the boundaries of said two regions occurs, then accumulating tuples associated with the other of region, and so on until the indexing cell is traversed.

Given the tuples included from the set operations on all (boundary, boundary) indexing cells, it is a simple task to combine the result with the set operations on (interior, interior) indexing cells and (interior, boundary) indexing cells in a known manner to produce a complete union or intersection.

The foregoing method fully capitalizes on the efficiencies gained by quadtree-indexed vector representation, and as shown below is capable of giving orders of magnitude improvement in efficiency over current computational methods.

DESCRIPTION OF THE SEVERAL VIEWS OF THE DRAWING(S)

Other objects, features, and advantages of the present invention will become more apparent from the following detailed description of the preferred embodiment and certain modifications thereof when taken together with the accompanying drawings in which:

FIG. 1 is a graphical illustration of interior and boundary quadtree cells associated with a polygon-represented region;

FIG. 2 is a graphical example of a multiply-connected polygon having a hole;

Figure 3:
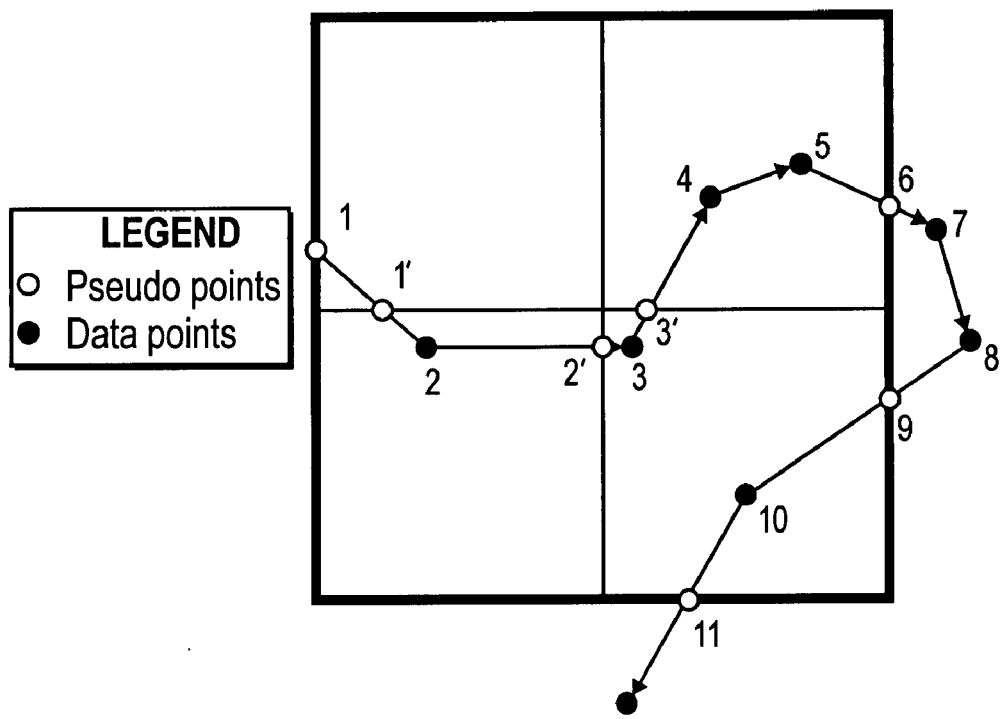
FIG. 3 illustrates a two-level decomposition of a quadtree-indexed vector spatial representation.
Figure 4:
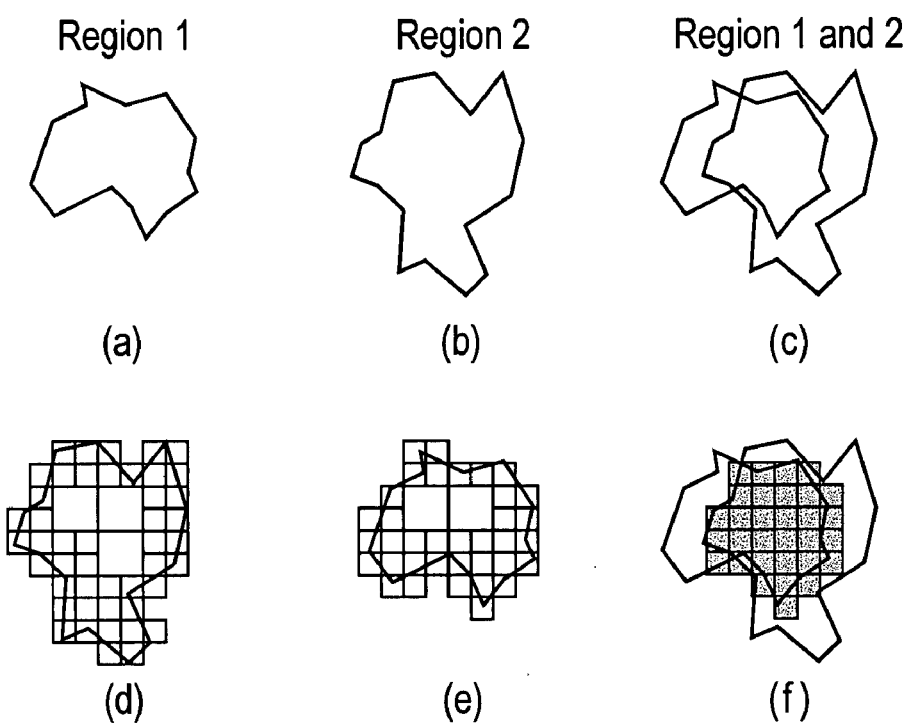
Figure 5:
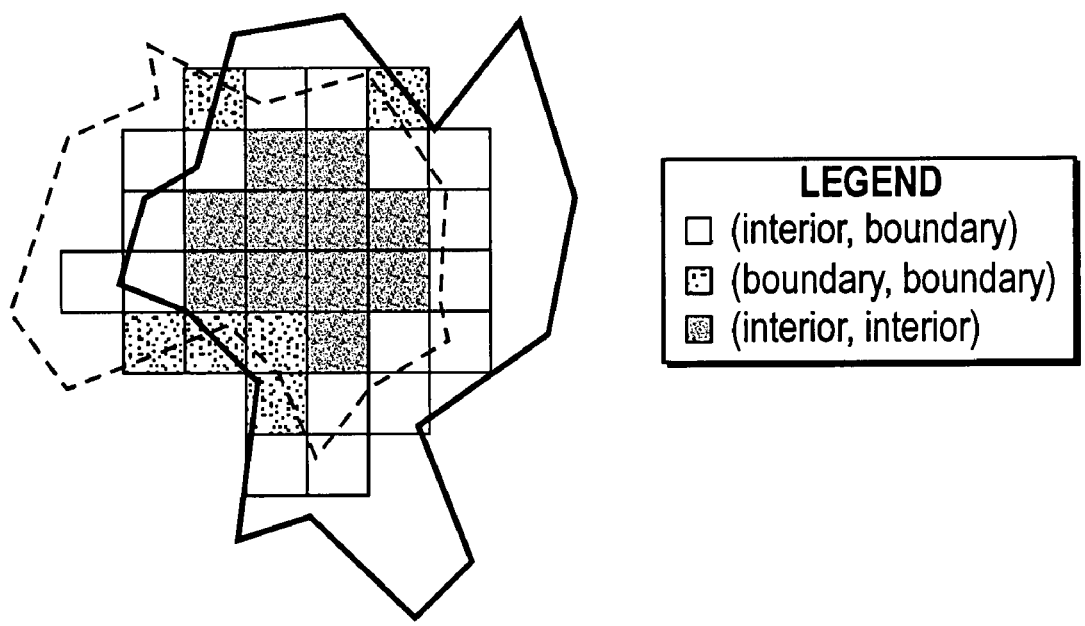
Figure 7:
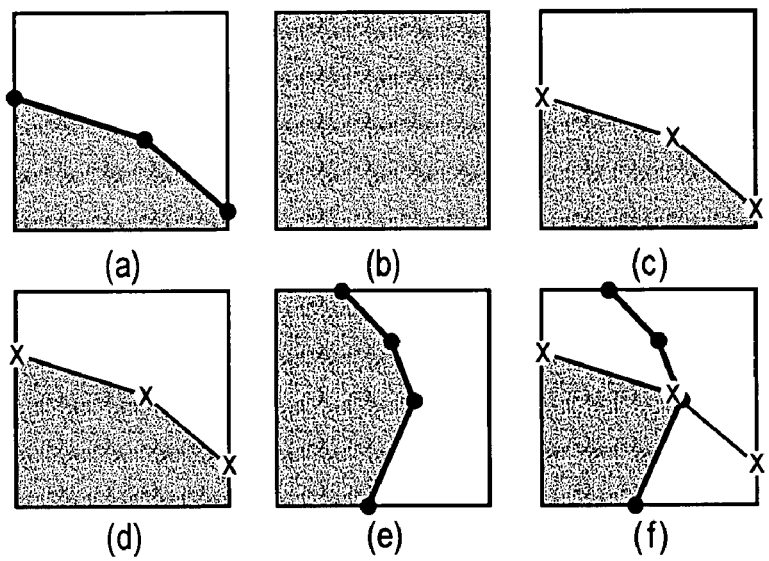
Figure 6:
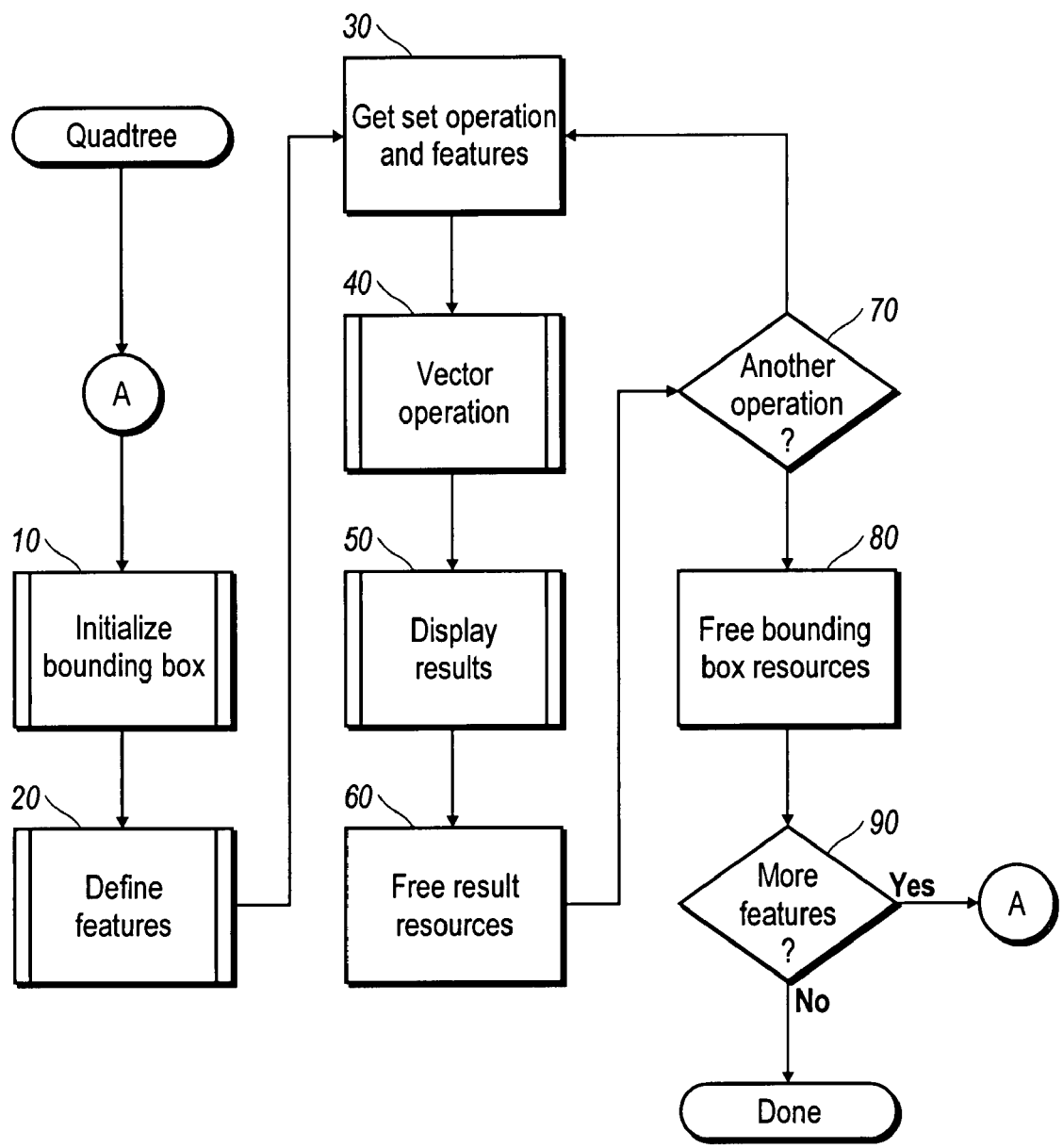
Figure 9:
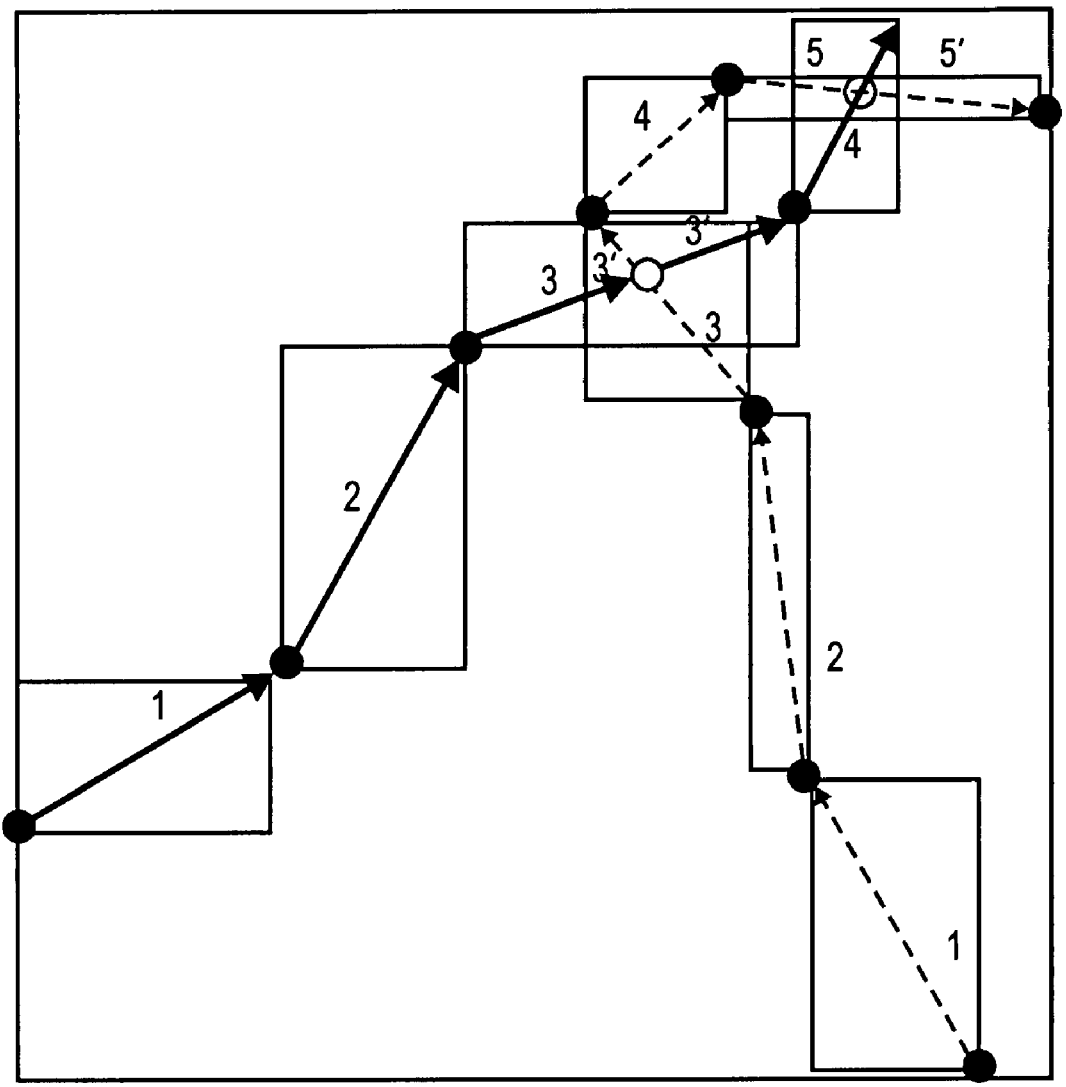
Figure 10:
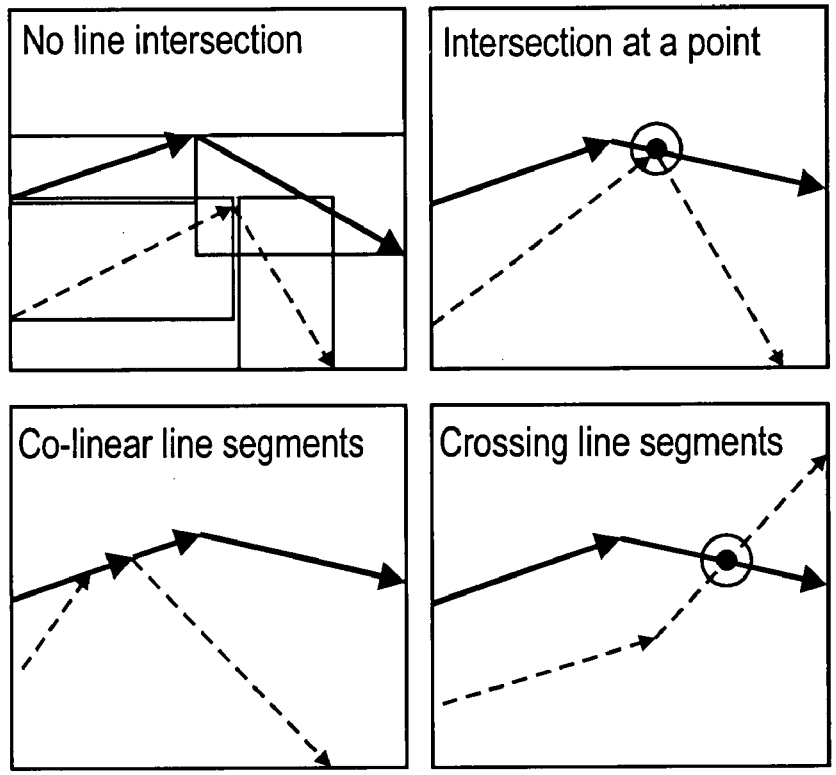
Figure 11:
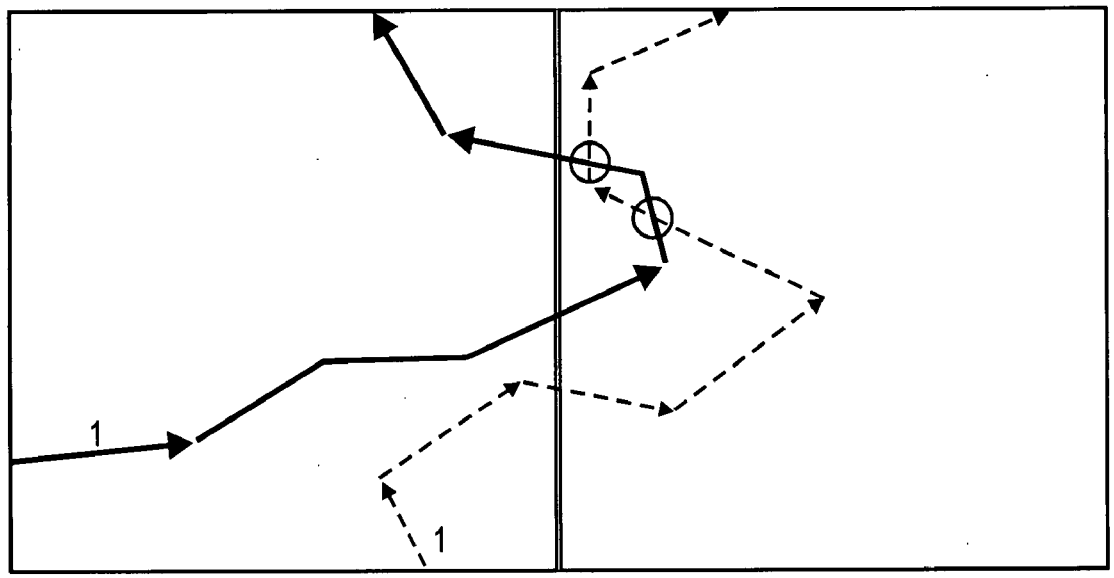
Figure 12:
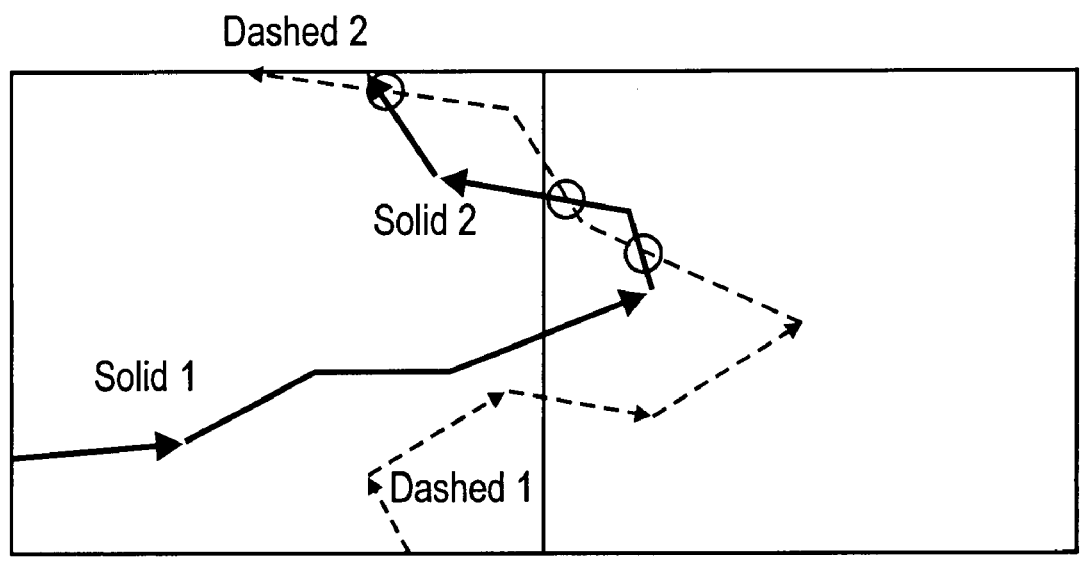
Figure 13:
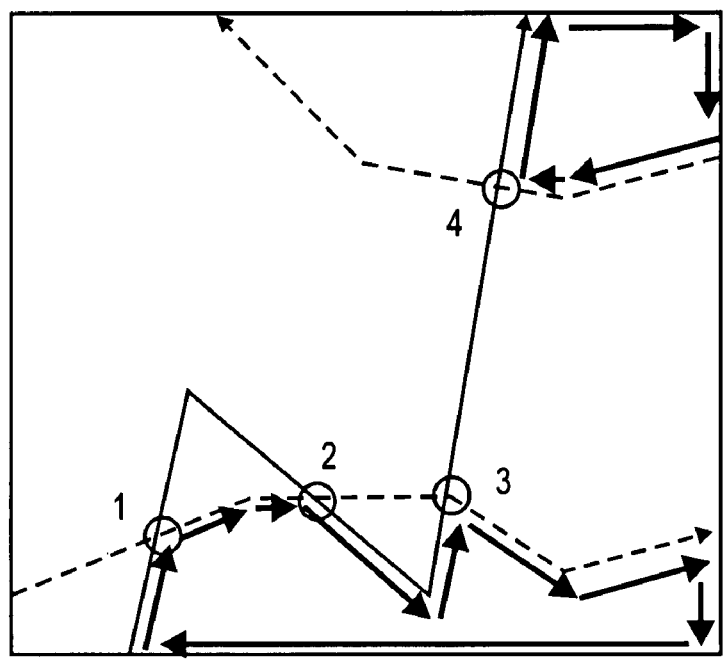
Figure 14:
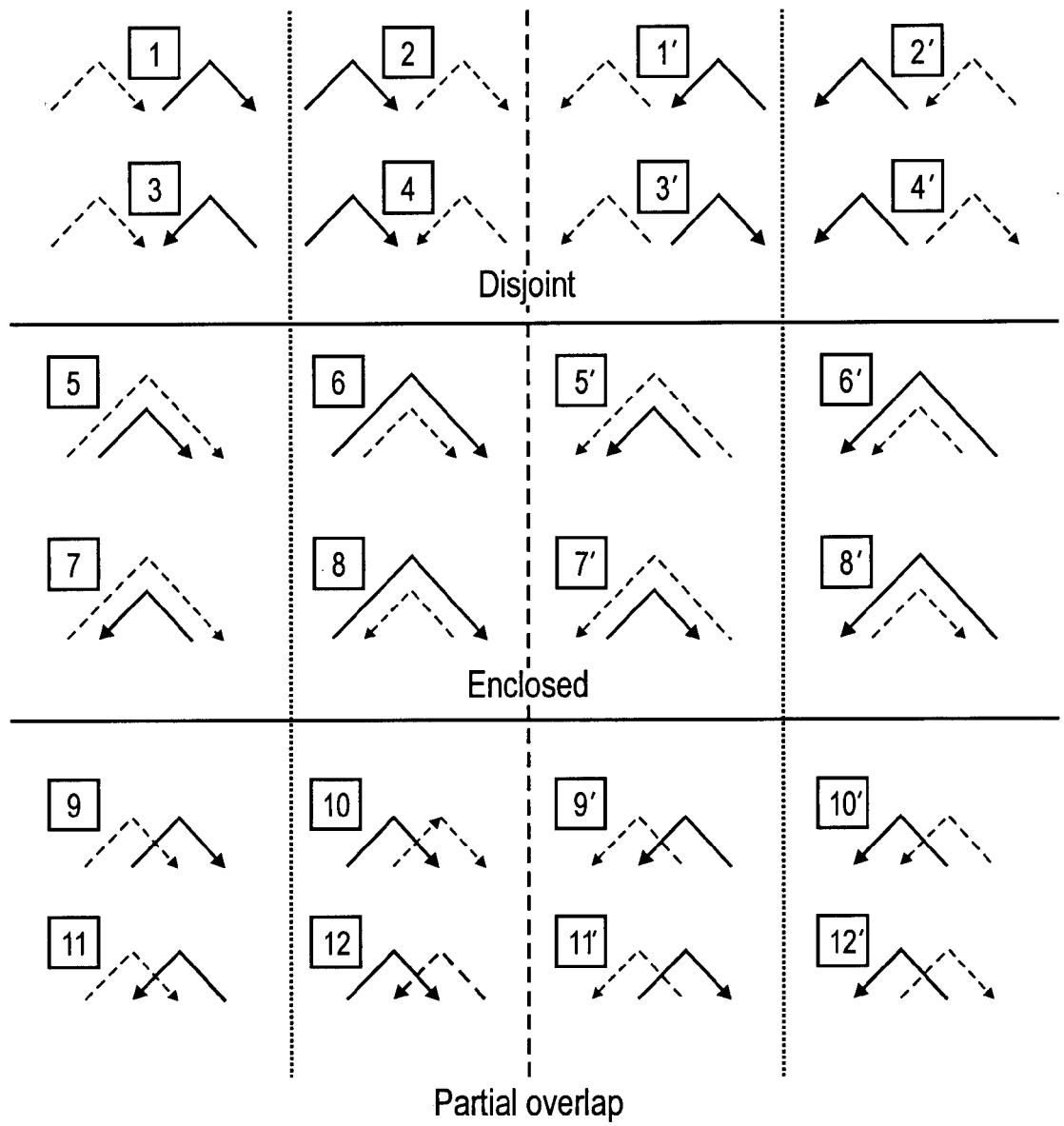
Figure 16:
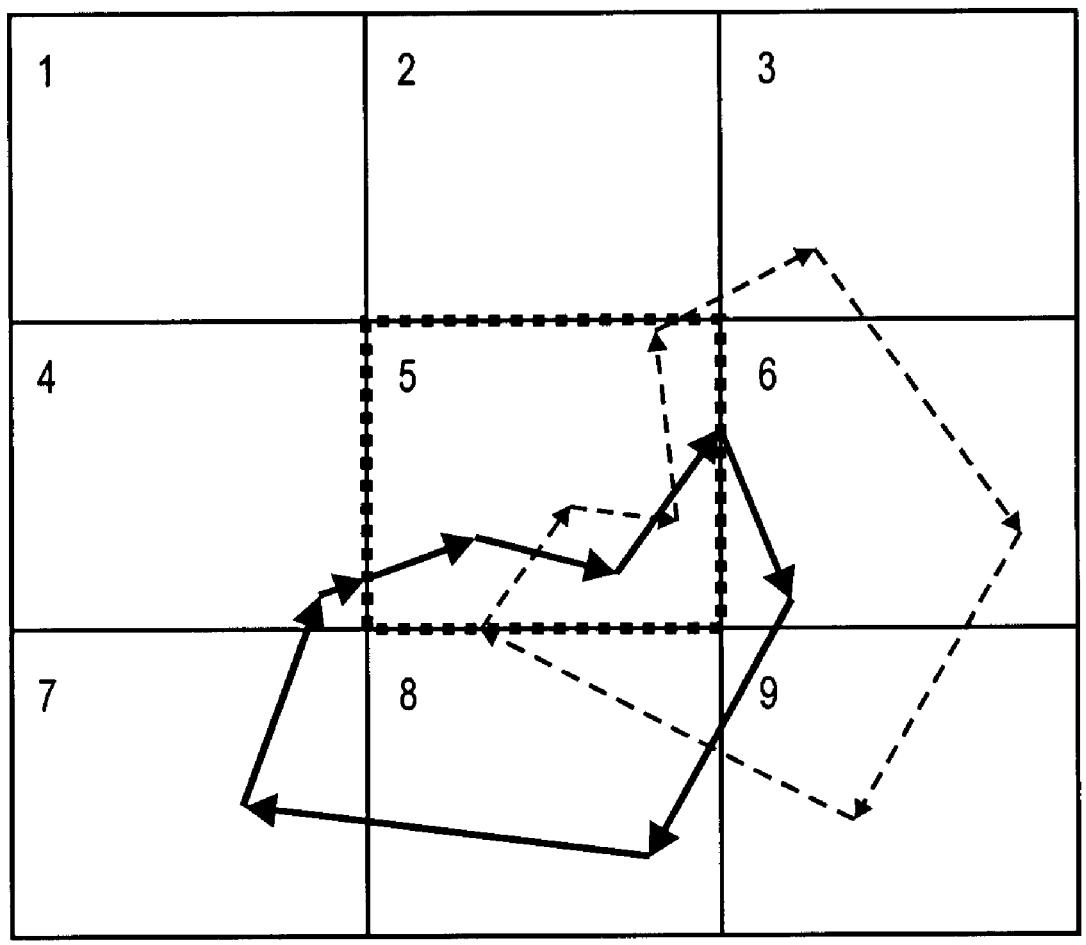
Figure 17:
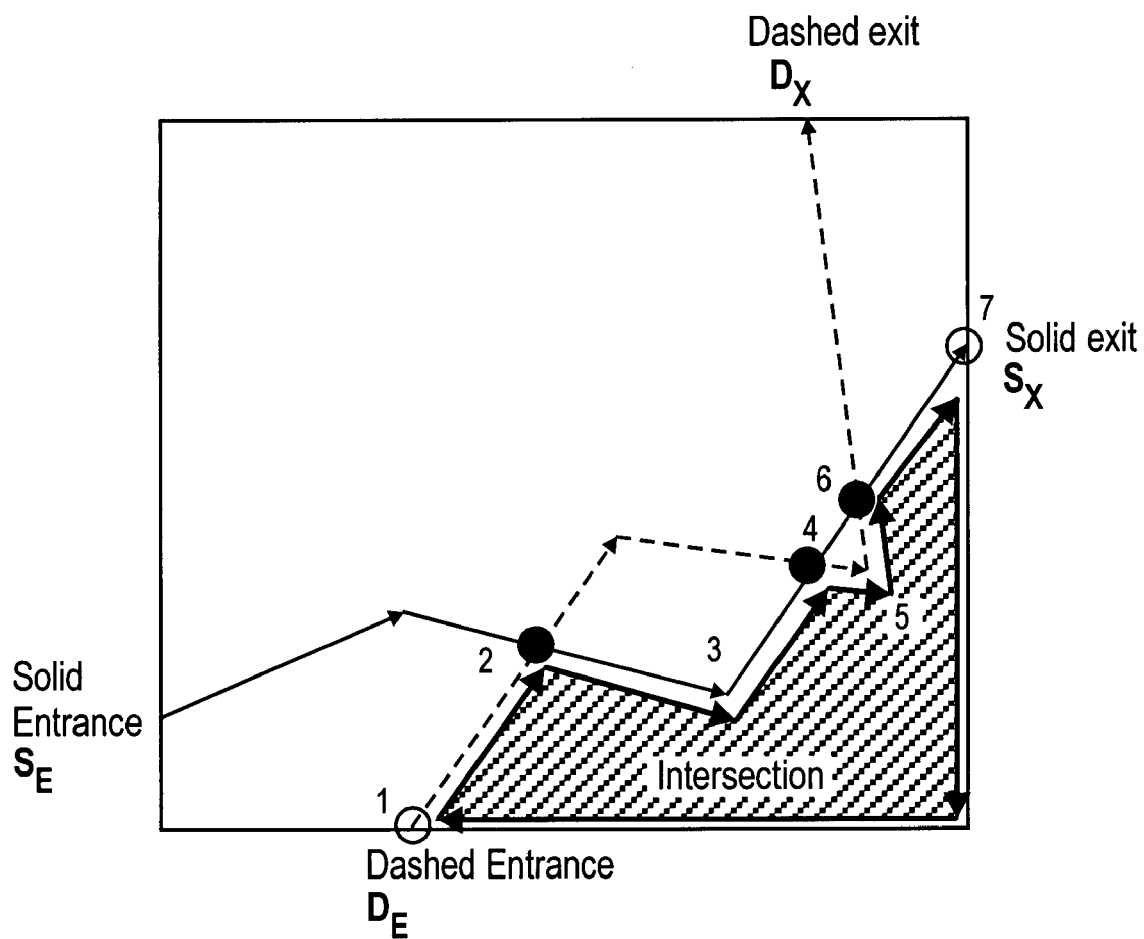
Figure 18:
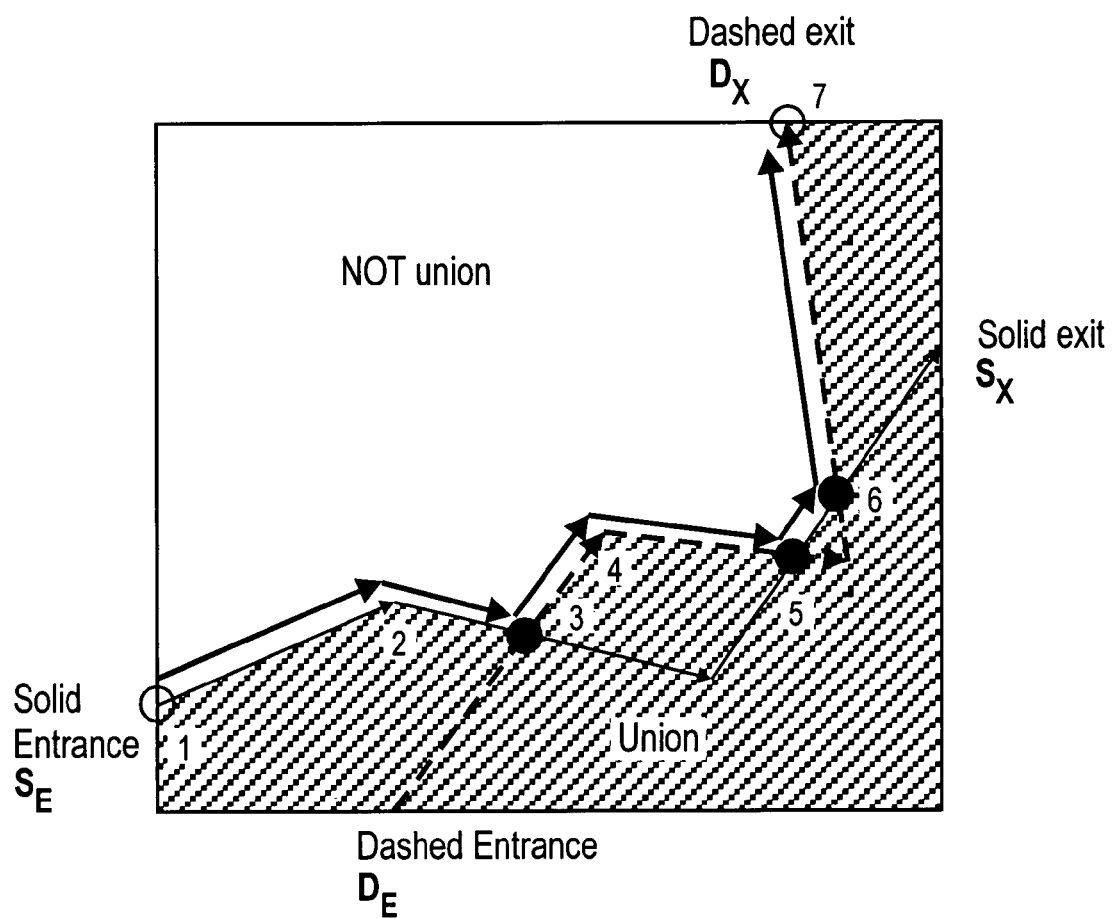
Figure 19:
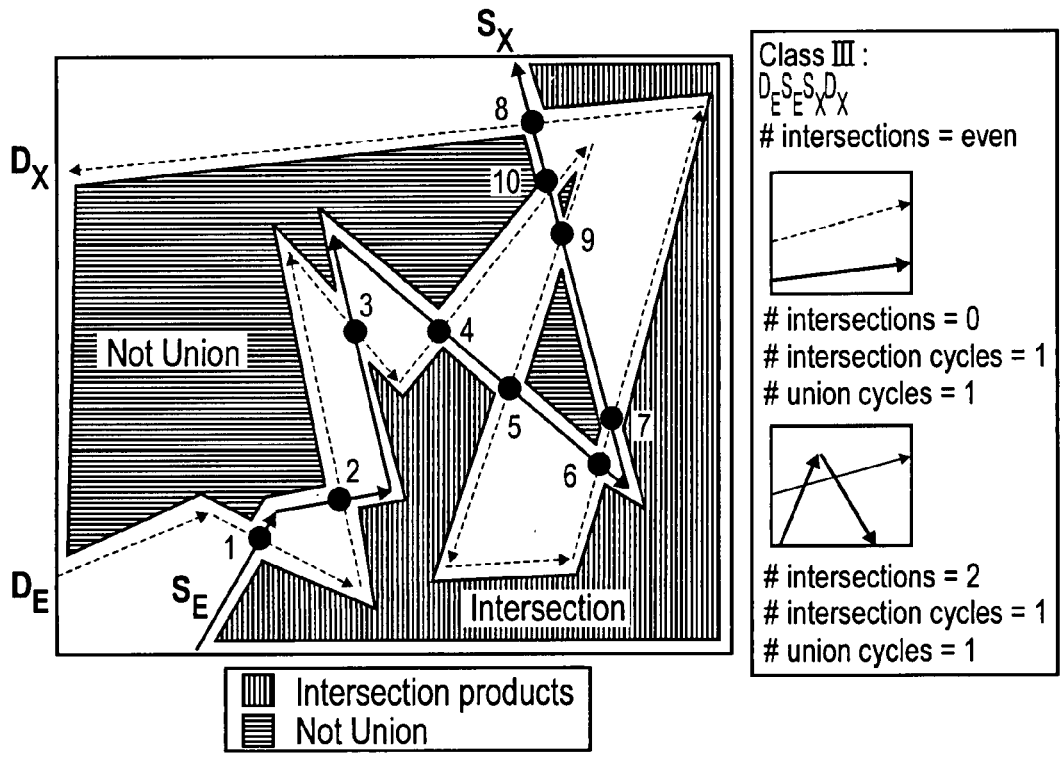
Figure 20:
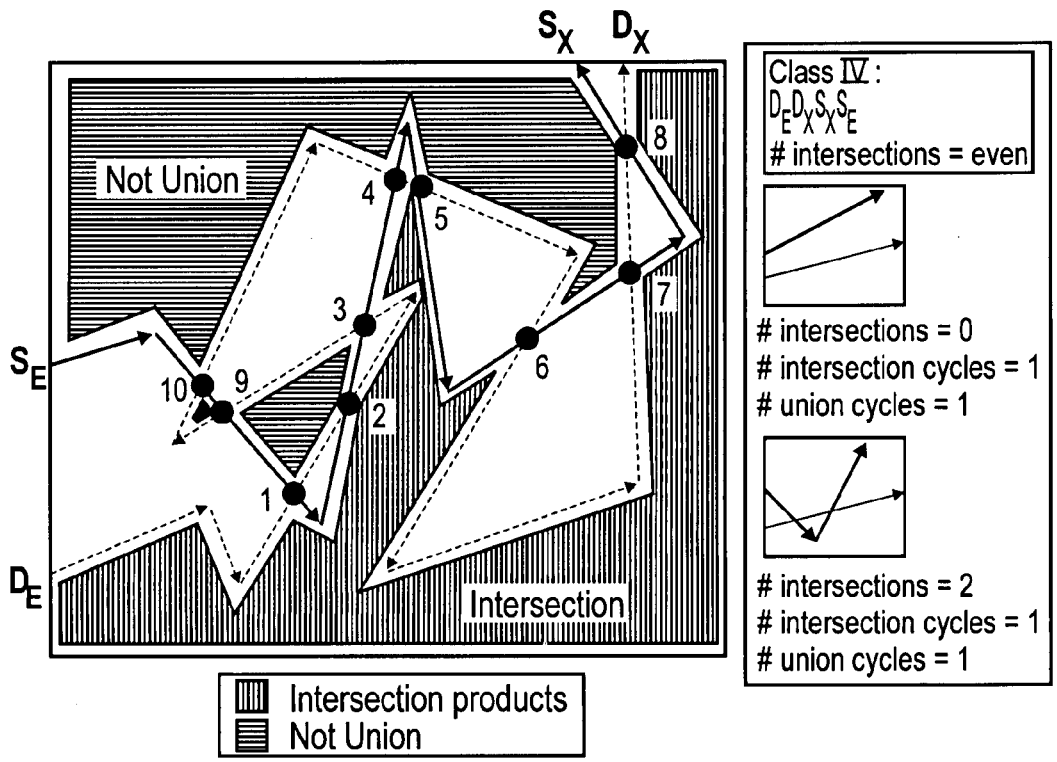
Figure 21:
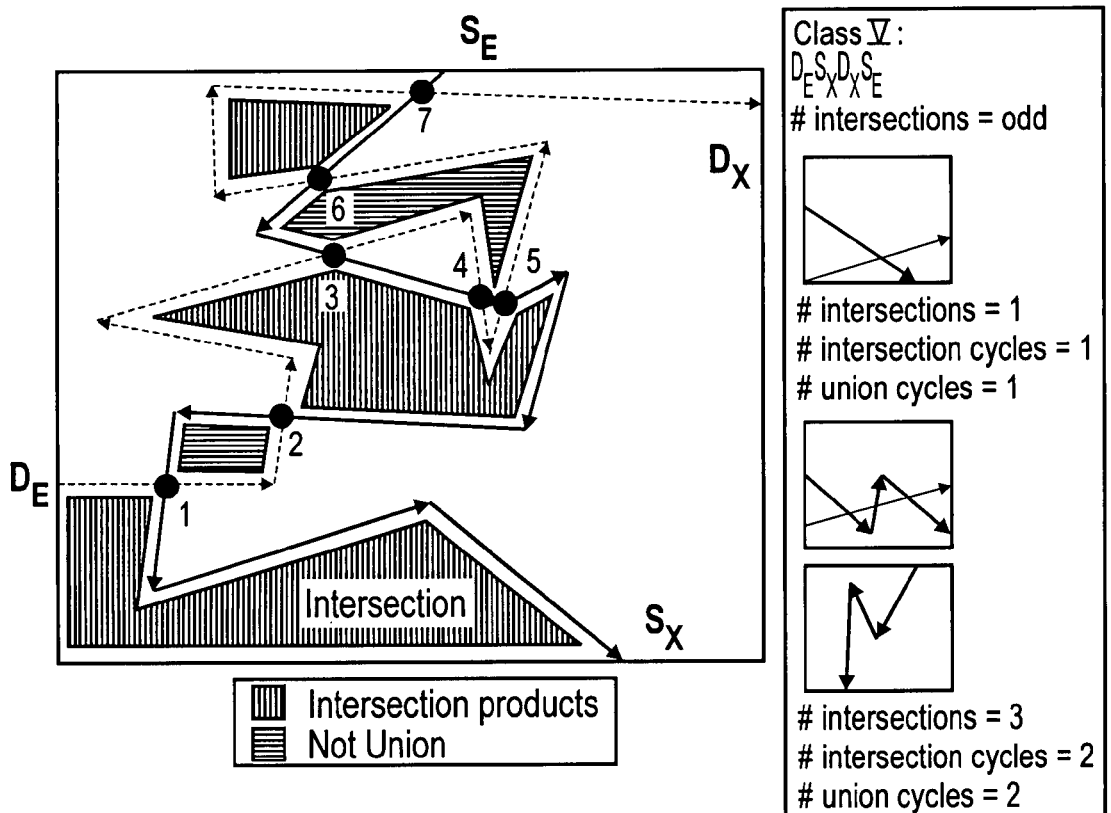
Figure 22:
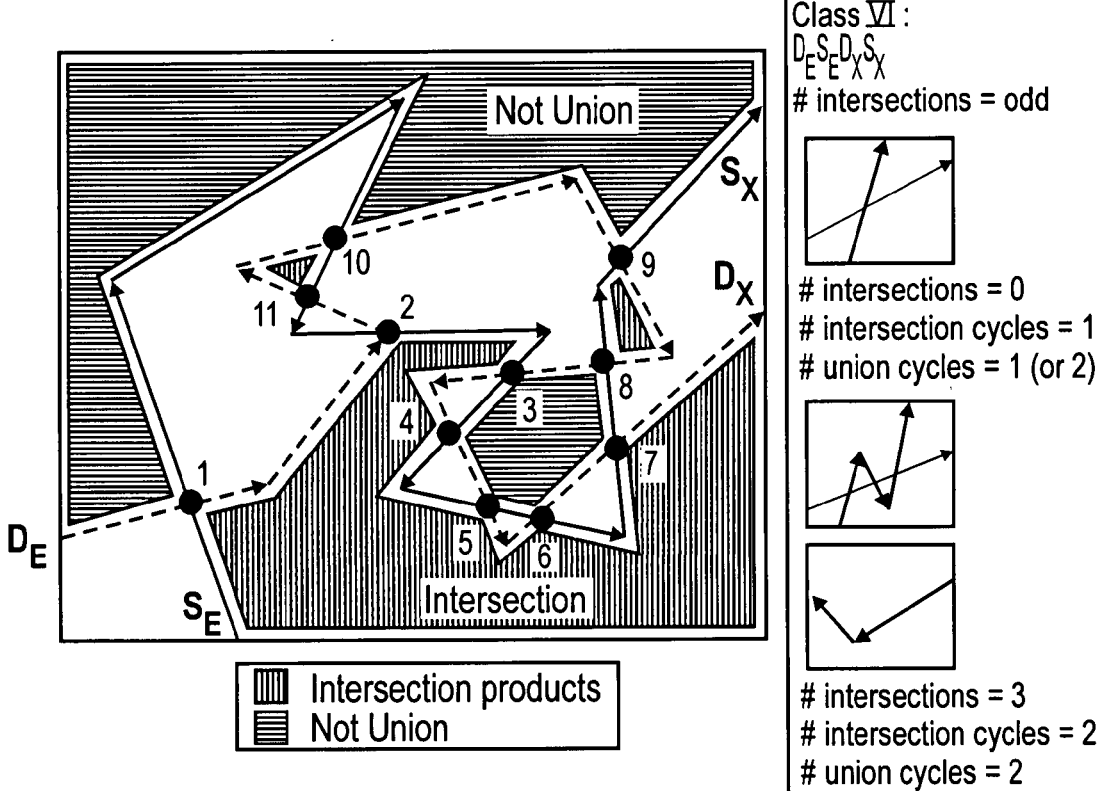
Figure 23:
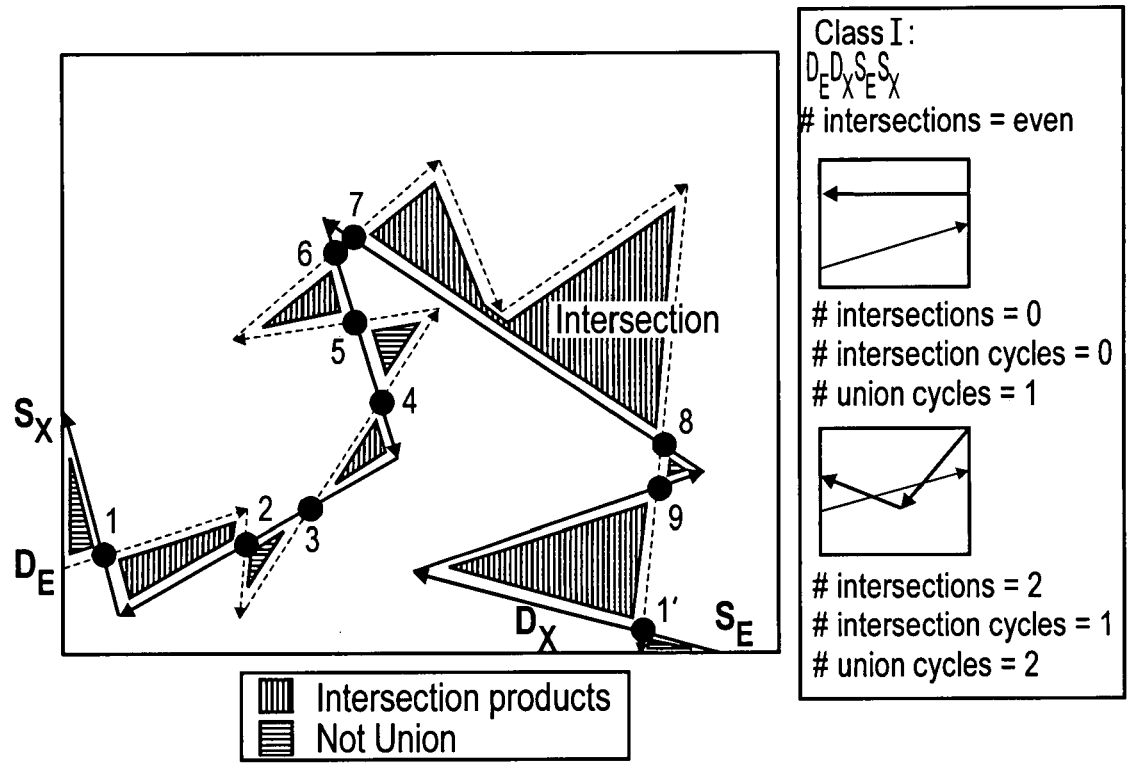
Figure 24:
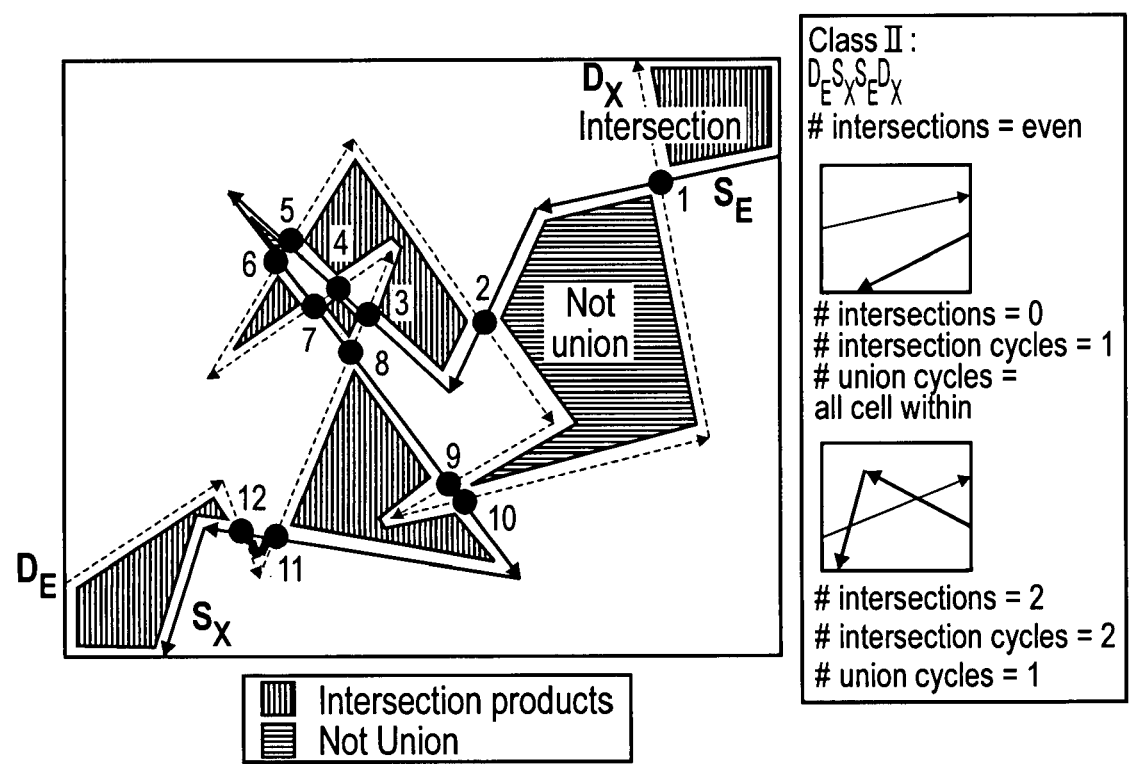
Figure 25:
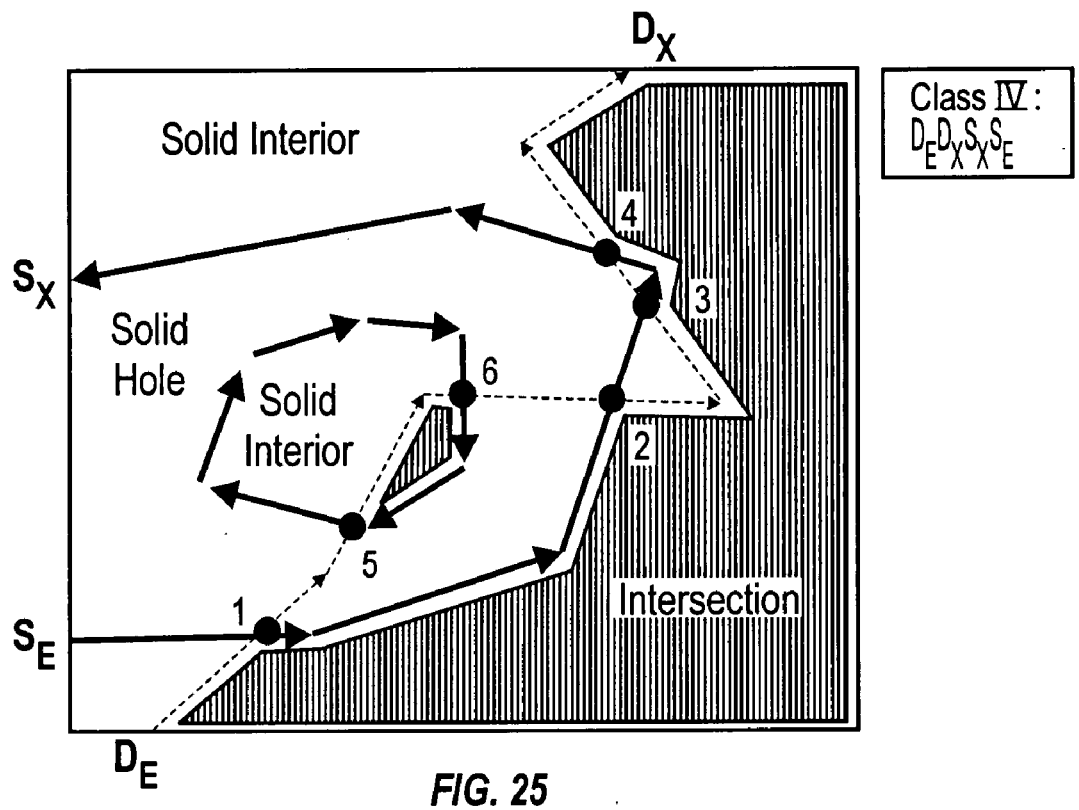
Figure 26:
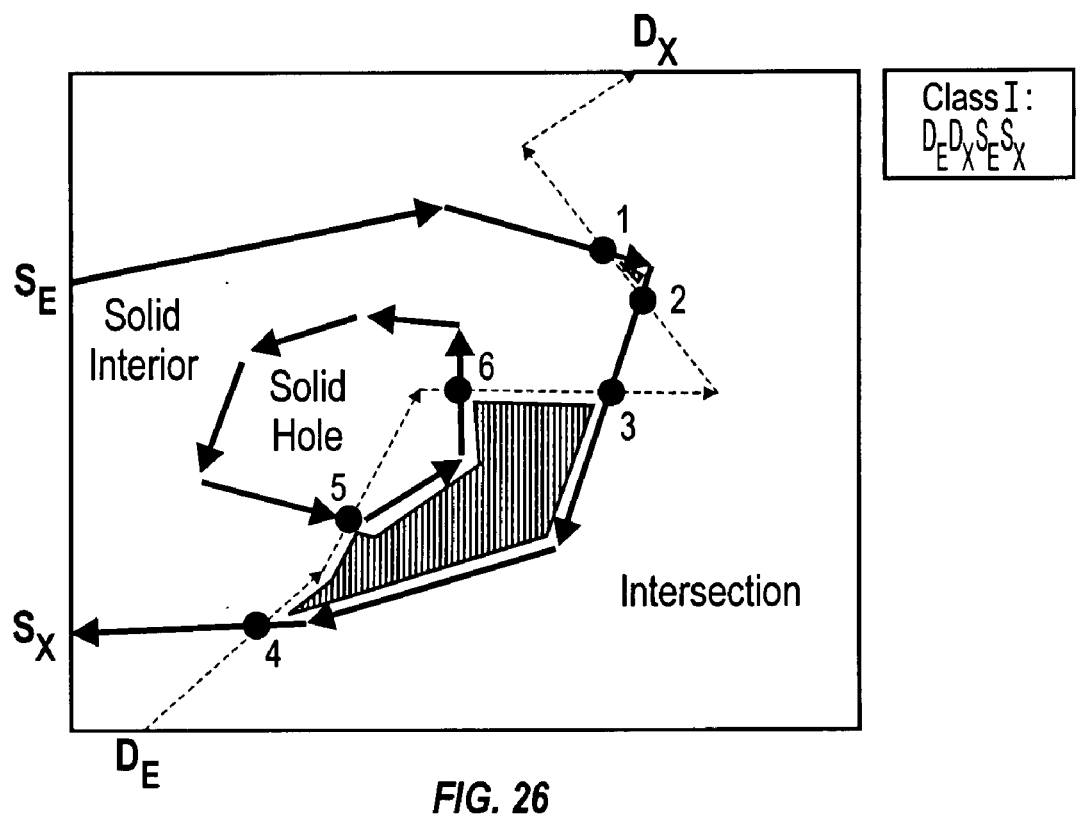
Figure 27:
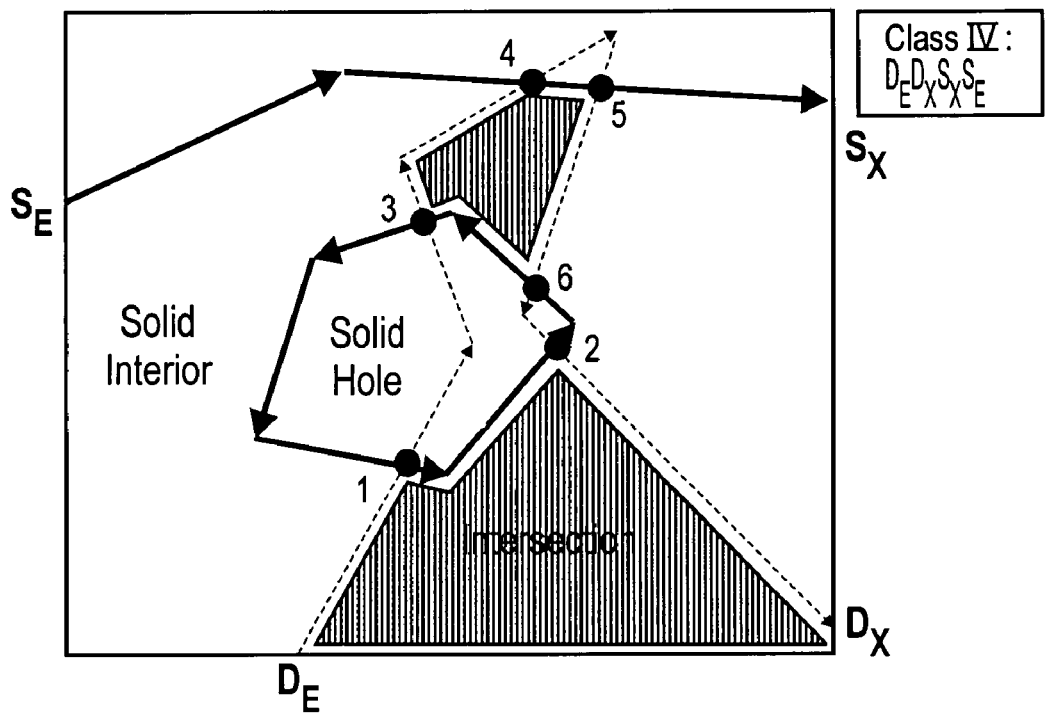
Figure 28:
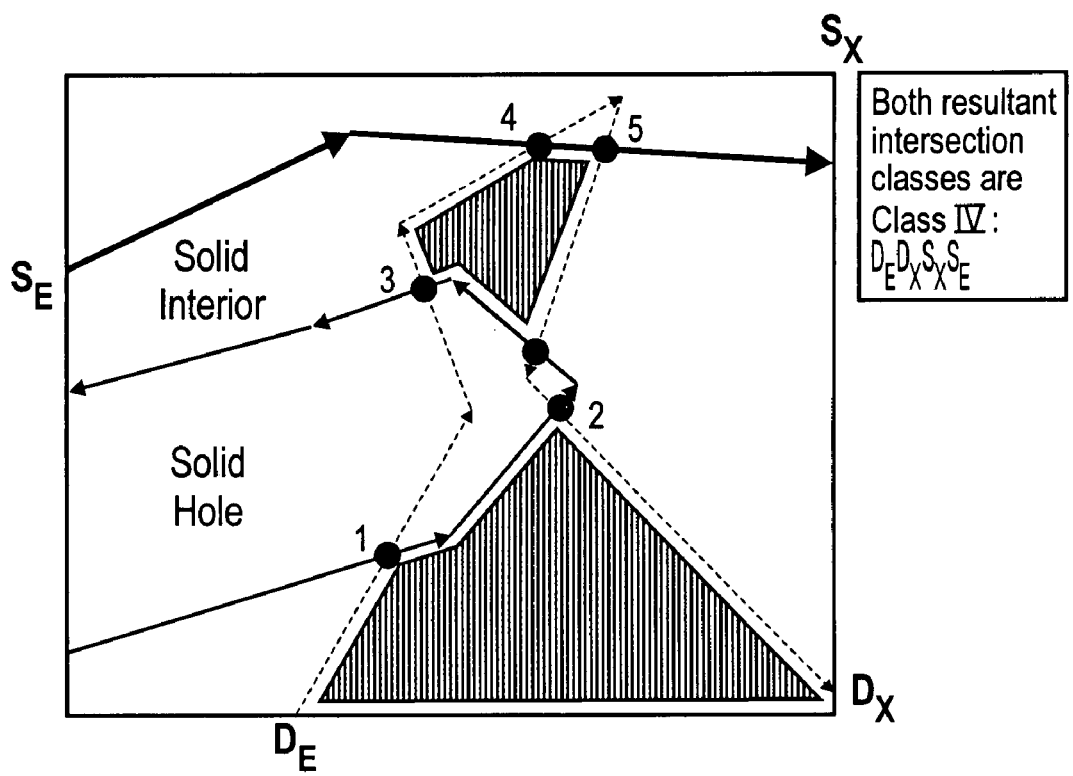

FIG. 4(a)-(f) illustrates an example of the quadtree-based intersection of two regions;

FIG. 5 is an exploded view of the set operation interaction shown in FIG. 4;

FIG. 6 is a flow chart implementation reflecting the software steps for implementing the software method of the present invention;

FIG. 7 is a graphical illustration of the intersection of a boundary cell and an interior cell (upper row a-c) and the intersection of two boundary cells (lower row d-f). The interior of all regions are shown as shaded;

FIG. 8 is a graphical illustration of the various kinds of bounding box relationships between line segments for two features;

FIG. 9 is a graphical example of two lineal features within a quadtree indexing cell showing each tuple-pair bounding box;

FIG. 10 is a graphical illustration of the four possible interactions between two line segments whose bounding boxes intersect;

FIG. 11 is a graphical illustration of two region boundary features in two adjacent boundary cells;

FIG. 12 is a graphical illustration of two region boundary features that both reenter a cell;

FIG. 13 is a graphical illustration showing a feature boundary reentry;

FIG. 14 is a catalog of twenty-four possible boundary cell interaction cases;

FIG. 15 is a table that summarizes the prescribed manner for following (or "tracing") the features from a designated entry or exit point and onward to the next polyline intersection point;

FIG. 16 is a graphical illustration of a grid of nine quadtree-indexing cells associated with two polygon-represented regions;

FIGS. 17 and 18 provide expanded views of the center-cell of FIG. 16;

FIGS. 19-22 provide graphical illustrations of representative examples that demonstrate the application of FIG. 15 for Categories III-VI;

FIG. 23 is a graphical illustration of a representative example Category I interaction;

FIG. 24 is a graphical illustration of a representative example Category II interaction;

FIGS. 25-28 provide graphical examples that illustrate the analysis of regions with included holes;

FIG. 29 is a table that summarizes general characteristics of each canonical form class; and FIG. 30 is a graphical illustration of two regions exhibiting (a) limited boundary cell overlap and (b) two regions exhibiting extensive edge overlap;

DETAILED DESCRIPTION OF THE INVENTION

An entirely new and improved method and software implementation is disclosed for generating Boolean set intersection and set union among two regions defined by a quadtree-indexed vector representation of data point tuples using a digital computer. Rather than relying on traditional cell-by-cell ANDing operations for identifying indexing cells that interact, the present method treats index cell interaction as a spatial search problem.

Two of the steps are known (Antony treatise, supra at 95), and these include the steps of: 1) establishing indexing cells about the two subject regions; and 2) distinguishing three canonical form classes of indexing cells: Class 1 interactions containing overlapping interior cells of both regions; Class 2 interactions containing interior cells of one region and a portion of a boundary of the other regions; and Class 3 interactions which contain a portion of the boundaries of both of the regions (boundary, boundary). The remaining novel steps, when performed in combination, speed set operation processing considerably. These steps are generally as follows: 3) defining pseudo points for each Class 3 (boundary, boundary) indexing cell; 4) categorizing each (boundary, boundary) indexing cell based on a relationship of its defined pseudo points, and identifying one of the two regions to be a starting region for that indexing cell based on the categorization; and 5) given the category and starting region, performing the set operation by including all tuples in each (boundary, boundary) indexing cell that are encountered while following ("tracing") the boundary of the starting region until an intersection of the boundaries of the two regions occur, then accumulating tuples associated with the other region, and switching regions at each intersection until the indexing cell is traversed.

FIG. 6 is a flow chart implementation reflecting the software steps for implementing the above-described method.

At step 10, the method initializes the bounding box and then establishes a grid of indexing cells about two subject regions. Initialization of the bounding box is simply accomplished by establishing the problem space about two subject regions, and then decomposing the problem space into the grid array of indexing cells. At the first level of decomposition, a selected problem space is sub-divided into four equal-sized quadrants. Each of these quadrants is then recursively decomposed into four equal size quadrants. Preferably, the number of levels of decomposition can be user-selected. At each level of decomposition, the quadtree provides a mutually exclusive and exhaustive representation of a selected region of the problem space. The net result is a variable (user-sized) grid of indexing cells about the two subject regions.

At step 20, pseudo-points are defined for the borders of the two regions. For each indexing cell of the grid that contains part of the boundary of at least one region (a boundary indexing cell), pseudo-points are assigned at the position of entry and exit of each region's border from that indexing cell.

At step 30, the desired type of set operation is retrieved (by user-input or preprogramming), and this may either be Quad intersection or union.

At step 40, the vector operation is performed. The software implementation of this step preferably involves two precautionary pre-tests to avoid undue processing. A first pre-test is run to ensure that the operation is not being performed on the same region (as opposed to two different regions). If performed on the same region, the solution for both indexing cell (Quad) intersection or union is simply the list of tuples associated with the singular region. The second pre-test is performed to ensure that the solution is not a null solution (in other words, that the two regions do interact by some degree).

Assuming some interaction, the operation continues to the novel processing steps in accordance with the present invention. Interactions between indexing cells are classified as follows: interactions between two interior cells (interior, interior), interactions between a boundary and an interior cell (interior, boundary), and interactions between two boundary cells (boundary, boundary) indexing cells. These three classes are treated separately as follows:

Class 1: (Interior, Interior) Cells

All matching interior cells within the two regions are added to the intersection product. For set union, all (non-duplicate) interior cells of the two regions are included in the product. Duplicate cells can be readily identified as those interior cells that are within the set intersection product (to be within the intersection product, both regions must necessarily contain identical cells). If the cells in the two data sets possess different indexing cell sizes (i.e., different levels of quadtree decomposition), the product for set intersection is the smaller of the two cells, while the product for set union is the larger of the two cells. Consequently, both Class-1 intersection and union generation operations inherently handle disparate size quadtree cells.

Class 2: (Interior, Boundary) Cells

As illustrated in the first row of FIG. 7 (*a-c*), the set intersection of a boundary cell (a) and an interior cell (b) yields the boundary cell (c), unless the boundary cell is physically larger (coarser decomposition level) than the interior cell. In this case, the intersection product is the boundary representation that occurs within the smaller interior quadtree cell. For set union, the product is the interior cell (b), independent of cell size.

Class 3: (Boundary, Boundary) Cells

Whereas Class 1 and Class 2 set operation products are straightforward to compute, Class 3 products (second row in FIG. 7) represent a considerably more challenging problem. The method of the instant invention includes an optimal procedure for generating Class 3 Boolean set operation products. The optimal procedure stems from the realization that for set operation generation, there exist six categorical Class 3 product forms. These forms are topologically complete in the sense that they characterize all possible region boundary interactions between two data sets. Moreover, given the canonical form category of a particular (boundary, boundary) cell, the set operation procedure for that cell can be determined based solely on the ordering of the entrance and exit pseudo-points along the boundary of a quadtree-indexing cell. This characterization leads to a well-behaved procedure capable of efficiently constructing both the intersection and union product for a given indexing cell once (1) the canonical form category is established and (2) all polyline feature intersection points within the cell are computed. As proven below, the procedure is potentially order of magnitudes faster than traditional computational geometry approaches. Furthermore, since each (boundary, boundary) cell operation is fully independent, Class 3 operations can be performed in parallel, further enhancing set operation generation performance.

Specifically, the Class 3 operation begins by employing simple algebraic techniques to compute all intersection points between the linear boundaries of the two regions within an indexing cell. Once computed, these intersection points are added at their appropriate location within each feature's ordered tuple lists.

FIG. 8 is a graphical illustration of the various kinds of bounding box relationships between line segments for two features.

FIG. 9 is a graphical example of two lineal features within a quadtree indexing cell showing each tuple-pair bounding box. Arrowheads indicate line segment direction.

With collective reference to FIGS. 8 and 9, note that the intersection points must be tagged to distinguish them from both data tuples and pseudo points. This is necessary because bounding boxes associated with individual tuple pairs from two (or more) regions might intersect while the line segments (represented by a tuple pair) might not intersect. In the example shown in FIG. 8, the bounding boxes for some solid segments (indicated in FIG. 8 by the "prime" mark "'" in the top portion of the figure) and dashed segments (indicated in FIG. 8 by unprimed numbers in the top portion of the figure) overlap while others do not (For convenience, the terms "solid" and "dashed" are used throughout this document to distinguish the two features that exist within a given indexing cell. However, the designation is totally arbitrary). Because line segments whose bounding boxes overlap may not actually intersect, bounding box intersection is merely a precursor to line segment intersection determination.

A simple procedure, such as the approach offered below, can be used to compute all line segment intersection points within a boundary cell:

1. Test all line-segment bounding boxes associated with tuple pairs for possible intersection.

2. For all bounding box pairs that intersect, determine possible intersection points of the line segments by first computing the intersection points of the associated lines (Note: these lines extend to infinity):

$y=mx-mx_i+y_i$(associated with dashed segment), and $y'=m'x'-m'x'_i+y'_i$ associated with solid segment);

where $m=(y_{i+1}-y_i)/(x_{i+1}-x_i)$, $m'=(y'_{i+1}-y'_i)/(x'_{i+1}-x'_i)$ $y=mx-mx_i+y_i=mx+K$ where $K=-mx_i+y_i$, and $y'=m'x=m'x'_i+y'_i=m'x+K'$ where $K'=-m'x'_i+y'_i$;

set x=x' and y=y' to locate point of intersection:

$\Rightarrow (m-m')x=K'-K$; and $\Rightarrow x$ intersection point$=(K'-K)/(m-m')$.

To prevent overflow, it is necessary to check to see if m=m' before this computation is performed. If m=m', do not attempt to compute the intersection point since the two lines are parallel and therefore can not intersect. Once the x value of the intersection point is computed, then compute the y intersection point:

$y$ intersection point$=mx-mx_i+y_i$

3. To determine whether the line segments actually intersect, test whether the computed intersection point lies within the line-segment bounding boxes for both features. If the intersection point lies within both bounding boxes, the two line segments intersect, otherwise, they do not intersect.

4. All discovered intersection points are then added to both feature tuple lists between the appropriate end point tuples.

FIG. 10 illustrates the four possible interactions between two line segments whose bounding boxes intersect. In type 1 interaction, no intersection occurs. In type 2, line segments touch at a point. In type 3, line segments from the two features are co-linear. In type 4, two features cross each other at a point.

FIG. 11 illustrates two region boundary features in two adjacent boundary cells. In this case, the solid feature begins in the left-hand cell, moves to the right-hand cell, and then reenters the left-hand cell. In such case, the intersection product follows the dashed (or "inside" feature) boundary.

FIG. 12 illustrates two region boundary features that both reenter a cell. In this case, each cell is treated independently, and all secondary (tertiary, etc.) entrance points are handled sequentially. In the case of the left hand cell in FIG. 12, the boundaries marked "Solid 1" and "Dashed 1" could be treated first, the product of "Solid 2" and "Dashed 2" treated second, and the two results combined. Alternatively, the first product could be combined with "Solid 2" and the resultant product combined with "Dashed 2." The basic analytical process described herein, however, remains the same.

FIG. 13 illustrates a feature boundary reentry and demonstrates that the intersection product consists of two distinct closed line-segment "cycles" as outlined by the bold line segments. The cycles include both intersection points and pseudo-points. A set operation is performed by including a list of tuples encountered while following ("tracing") the cycles until complete. However, the tracing of line-segments depends on the orientation of the region boundaries, which is in turn reflected by the orderings of entry and exit pseudo-points.

FIG. 14 catalogs the twenty-four possible boundary cell interaction cases, providing a systematic and exhaustive characterization of all possible entrance and exit pseudo-point tuple orderings. Because, as already discussed, the starting tuple for the orderings is entirely arbitrary, four cyclical orderings exist that describe the identical entrance and exit point relationships. For instance:

Dashed Entrance ($D_E$), Solid Entrance ($S_E$), Solid exit ($S_X$), Dashed exit ($D_X$) characterizes the identical cell boundary relationships (and consequently represents the same canonical form) as: Solid Entrance ($S_E$), Solid exit ($S_X$), Dashed exit ($D_X$), Dashed Entrance ($D_E$). Consequently, there exist only six canonical orderings.

In the method of the present invention, the set operation is completed by collecting tuples from the two region lists (in a manner prescribed by the canonical ordering of entrance and exit point relationships) until the cycle closes on itself (the sequence of assigned tuples returns to its starting tuple).

More specifically, Class 3 union and intersection operations generate two types of tuple cycles: boundary closing and internal. Boundary-closing cycles are formed by starting at either a solid ($S_E$) and/or (depending on the boundary cell x boundary cell category) dashed ($D_E$) feature entry tuple (or pseudo point). Boundary cycles are so named because the cycle implicitly closes along the cell boundary (or edge). Internal cycles begin at a polyline intersection point and follow features in a prescribed manner, until the initial intersection point is reached (or the cycle is complete). In both cases, the features are followed from a designated entry or exit point and onward to the next polyline intersection point of the two regions. The tracing then switches to the other region, accumulating tuples associated with the other region, and so on until the indexing cell is traversed. This process of switching features at each successive polyline intersection point continues until the cycle is complete. A boundary-closing cycle is complete once the edge of the quadtree cell is reached (in other words, when a pseudo point on the indexing cell boundary is hit). Internal cycles are complete when the accumulation process reaches the starting tuple for that cycle (without encountering a pseudo point on the indexing cell boundary).

FIG. 15 is a table that summarizes the prescribed manner for following (or "tracing") the features from a designated entry or exit point and onward to the next polyline intersection point, etc., and onward according to the generation methodology of the present invention. Column 1 lists the six unique cyclical orderings of entrance and exit tuples for a given quadtree-indexed cell. Column 2 identifies the assigned interaction Category ("interaction class") number (note that the categories are logically grouped and are not in strictly numeric order). Columns 3 and 4 specify the starting points for intersection and union generation, respectively, assuming "inside is to the right." Columns 5 and 6 specify the starting points for intersection and union generation, respectively, assuming "inside is to the left."

This recursive cycle generation process continues until all polyline intersection points within the cell have been used. As indicated by FIG. 15, for Categories III-VI, both intersection and union cycle generation begins with a boundary-closing cycle (cycle begins at a pseudo point). However, this is not the case of Categories I and II. We describe the cycle generation process for Categories III-VI first and then discuss the necessary modifications required to accommodate Categories I and II.

Category III-VI Intersection/Union Product Generation

The principal steps in constructing Category III-VI (boundary, boundary) intersection and union products can be summarized as follows:

(1) Evaluate the canonical form Category by determining the counter-clockwise ordering of the cell boundary entrance and exit points for the two features present in the cell. If one or both features reenter the cell, each interaction can be treated separately, or alternatively, the cell can be further decomposed to attempt to eliminate or at least reduce the number of feature re-entries, and thereby the complexity of the analysis.

(2) Construct the appropriate boundary-closing cycle(s) by determining from FIG. 15 the appropriate cell entry point (either dashed entrance or solid entrance) to begin cycle construction. Category III-VI possess only a single boundary closing cycle.

(3) Because boundary-closing cycles close on the edge of the quadtree-indexing cell, processing for such a cycle terminates once a pseudo point on the cell boundary is encountered during the cycle traversal operation. The boundary-closing segments of a boundary-closing cycle represent implicit boundaries and are not actually reported as part of the set operation product.

(4) Once the boundary-closing cycle has been constructed (the tuples collected), the next "unused" polyline intersection point (if one exists) associated' with the "entrance" feature list becomes the starting point for an internal cycle. Just as before, succeeding tuples for that feature are added to the list (effectively "tracing" the line segments in the region boundary) until the next internal polyline intersection point is reached. At that point, the tuple accumulation process ("feature-following") shifts to the other feature. This cycle-forming process continues until this new cycle is complete (the initial tuple in the cycle list is reached). Additional cycles, if they exist, begin at the next unused polyline intersection point.

(5) This "cycle generation" process is repeated until all the polyline intersection points within the cell have been utilized. The generated tuple list(s) becomes the final set operation product for that cell.

The (boundary, boundary) cell set operation generation process just described is further illustrated in the example shown in FIG. 16.

FIG. 16 depicts a grid of nine-quadtree-indexing cells associated with two polygon-represented regions. Cell 1 does not index either feature and therefore is not involved in any subsequent analysis. Cells 2, 3, 5, 6, 8, and 9 index the boundary of the dashed feature; Cells 4-9 index the boundary of the solid feature. Cells 2, 3, 4, and 7 index only a single feature and therefore contribute to the union product, but not to the intersection product. Cells 5, 6, 8, and 9 contain both dashed and solid feature tuples and therefore represent Class 3 interactions between two boundary cells (Antony treatise, supra at 95).

To simplify the discussion, we focus our attention on only the center cell (Cell 5) in FIG. 16.

FIGS. 17 and 18 provide expanded views of the center cell of FIG. 16. Specifically, FIG. 17 illustrates the intersection product generation process; FIG. 18 illustrates union generation. The polyline intersection points (inserted into the working memory tuple lists for both features) are shown as solid black circles; the entrance and exit pseudo points are indicated by open circles. The counter-clockwise ordering of the entrance and exit tuples ($D_X$, $S_E$, $D_E$, $S_X$) represents a cyclical ordering of Category V (FIG. 15, column 1, row 6). Using the convention that the inside of a region is "to the right," column 3 of FIG. 15 indicates that for a Category V interaction, intersection generation requires a single boundary-closing cycle (as seen in last row, third column). As indicated by this entry, the intersection product begins with the dashed entrance pseudo point $D_E$.

The desired set operation product for a cell is a list of all tuples for that part of the region intersection that occurs within the cell shown in FIG. 17. Starting with the dashed entrance point tuple, the dashed feature is followed (i.e., all encountered dashed tuples in the list are added to the intersection product) until the first polyline intersection point occurs (labeled Point 2 in the figure). At the intersection point, the tuple accumulation process continues by accumulating tuples associated with the solid feature (Point 3 is added to the product) until the next intersection point occurs (Point 4). Traversal is always in ascending order of the tuple lists. Because Point 4 is a polyline intersection point, accumulation continues by collecting tuples associated with the dashed feature (Point 5 is added to the list) until the third intersection point is reached (Point 6). Tuple accumulation resumes by following the tuple list of the solid feature until the solid feature reaches the cell boundary. At cell exit Point 7, the boundary-closing cycle processing terminates. (As discussed previously, a boundary-closing cycle implicitly closes on itself by following the boundary edge in the appropriate direction until the starting point of the cycle is reached. However, boundary cell edges are not reported as part of the set operation product). Thus, the intersection product for Cell 5 is reported as the list of Points 1-7. The bold gray arrows in FIG. 17 trace the boundary closing cycle. The gray-shaded hatched region denotes the "implied" region intersection product.

FIG. 18 illustrates the set union product generation for the center cell of FIG. 16. Referring to FIG. 15, column 4, row 6, the union product is seen to begin with the solid entrance feature. Just as in set intersection generation, the union product is produced by accumulating tuples from the two feature tuple lists (to which have been added all appropriate pseudo points and embedded polyline intersection points), alternating between solid and dashed tuples following each polyline intersection point. The union product is reported as the ordered (region boundary) list containing the seven points shown in FIG. 18. As is apparent, the only tuples shared by both the intersection and union products are the polyline intersection points. In this case, the union product is indicated by the cross-hatched region.

FIGS. 19-22 provide further representative examples that demonstrate the application of FIG. 15 for Categories III-VI. Intersection points are numbered in the direction of their use for intersection product generation. When there are complex interactions between two sets, it is often easier to picture NOT Union (regions outside the union product). Thus, in the following examples, regions not contained in (i.e., outside) the union product are filled horizontally. Intersection cycles are filled vertically. In other words, for set union, the entirety of each cell is inside the union product except for the union cycles filled horizontally.

Category I and II Intersection/Union Product Generation

Assuming "inside is to the right," for a Category I (boundary, boundary) cell interaction, set union begins with two boundary-closing cycles. For set intersection, on the other hand, there exist no boundary-closing cycles. The union boundary-closing cycles begin at both the dashed and solid feature entry points. For Category II, set intersection begins with two boundary-closing cycles. Set union contains no boundary-closing cycles. The intersection boundary-closing cycles begin with both the dashed and solid entry points. Just as in earlier examples, the intersection cycles filled vertically depict regions of the cell that are included in the product, whereas horizontal fill depicts regions of the cell that are not included in the union product.

Examples of the two cell interaction Categories are shown in FIGS. 23 and 24.

FIG. 23 offers an example of Category I interaction. As indicated in FIG. 15, for set union, boundary-closing cycles occur at both the solid and the dashed feature cell entrance points; the union cycles are shown by the horizontal fill. Because inside is to the right, these black triangular-shaped regions represent area excluded from the union, depicting areas within the cell that are not included in either region. The internal cycles shown with horizontal fill represent additional cycles ("holes" in the union). Note that alternating with the horizontal fill cycles, are other cycles are outlined in vertical fill. As in the earlier discussion, these cycles are associated with set intersection. As indicated in FIG. 15, set intersection cycles are generated by starting with either the solid or dashed feature at the first polyline intersection point (rather than the cell boundary pseudo point). Once the first intersection cycle is complete, additional cycles are generated (as discussed previously) until all the polyline intersection points have been exhausted.

FIG. 24 illustrates a Category II interaction problem. Once again, we assume that inside is to the right. As indicated in FIG. 15, there exist two intersection and no union boundary-closing cycles. The two intersection boundary-closing cycles are lines. The balance of the internal cycles shown represent additional cycles associated with the intersection product. Sandwiched between these intersection cycles are a series of those portions of the cell which are excluded from the union, characterized by regions shown in vertical fill lines. Identifying the portions of the cell excluded from the union cycle is accomplished by beginning at the first polyline intersection point associated with either the solid or dashed feature and continuing to accumulate cycles in the manner described previously until all the polyline intersection points have been exhausted.

Despite subtle differences between the construction of Category I & II and Category III-VI set operation products, the mechanics of the process are obviously quite similar. Once the first cycle has been developed (be it a boundary-closing or internal cycle), the next cycle (for the same Boolean set operation product) begins at the next unused intersection point. The construction process terminates when no unused intersection points remain. Note also that union cycles occur between intersection cycles and conversely, intersection cycles occur between union cycles, regardless of the cell interaction Category. Because of this characteristic of the method of instant invention, rather than independently generating intersection and union products, the method permits efficient construction of both products during a single pass.

Regions with Included Holes

Because the tuple ordering convention provides a consistent interpretation of a region's interior, the instant set operation generation procedure handles regions containing included holes without difficulty. FIGS. 25-28 provide examples that illustrate the straightforward nature of the analysis. As is evident in these figures, hole boundaries are handled identically to outer region boundaries in terms of set operation generation procedures. Note that in FIGS. 27 and 28, the intersection product remains the same, regardless of whether the hole is fully enclosed or only partially enclosed by the quadtree indexing cell.

Recursive Operation

Once a given cycle is complete, a determination must be made whether the analysis of that cell is finished. Cell processing is complete when no additional unused polyline intersection points exist. If unused polyline intersection points remain, at least one additional internal cycle must exist. The next remaining cycle begins at the next unused intersection point along the entrance feature indicated in FIG. 15 (actually, either feature may be followed as long as cycles are developed in ascending tuple order) and continues until the cycle is complete. Note that the number of internal cycles that exist within the cell is highly sensitive to the characteristics of the data sets. Thus, for two or more internal intersection points, the number of internal cycles can not be reliably predicted.

Final Product Development

The final set operation product of step 40 (FIG. 6) for two quadtree-represented regions is assembled as the concatenation of the products generated by the three stages of analysis. Class 1 analysis contributes only region interior cells. For set intersection, both Class 2 and Class 3 generate only boundary cell products; for set union, Class 2 generates only interior cells, while Class 3 generates boundary cell products. Under special conditions, the latter can generate interior cells. If the desired set operation product is a vector boundary list (rather than a quadtree-indexed vector representation), the ordered tuple list or lists (in the case of disjoint of embedded set operation products) is generated by a simple quadtree-indexed vector boundary cell-to-vector boundary conversion which effectively strips off the indexing cell representation.

In all of the examples presented in this document, the area "inside" a region has been assumed to be "to the right" of the ordered tuple boundary list. To maintain this convention, region boundaries use a clockwise tuple ordering. If, on the other hand, tuples are ordered in a counter-clockwise direction, "inside" will be "to the left."

FIG. 29 is a table that summarizes general characteristics of each canonical form class and reflects the fact that very similar procedures are appropriate for constructing set operation products for both ordering conventions. Columns 1 and 2 are identical to those in FIG. 15. Column 3 identifies whether the total number of polyline intersection points within a cell is odd or even. Column 4 identifies whether the entry/exit pseudo points for a given feature are adjacent (e.g., $D_E$, $D_X$, $S_E$, $S_X$) or whether they alternate (e.g., $D_E$, $S_E$, $D_X$, $S_X$). Columns 6 and 7 indicate the total number of intersection and union cycles that occur within the cell for the number of polyline intersection points specified in Column 5.

Referring back to the software flow of FIG. 6, after the final set operation product is calculated in step 40, the software method of the present invention proceeds through step 50 where the set operation product is displayed and/or otherwise output for the user. At step 60 the software preferably releases the memory resources that it used for the foregoing computation. The user is given the option of completing another set operation product at step 70, and if such is desired the program returns to step 30. Otherwise, at step 80 the software releases the memory resources that it used in establishing the bounding box. The user is given the option of adding more features to the problem at step 90, and if such is desired the features are added and the program returns to the beginning (A) for initialization of a new bounding box. Otherwise, the program is done.

The foregoing method capitalizes on the efficiencies gained by quadtree-indexed vector representation, and gives orders of magnitude improvement in efficiency over current computational methods.

Efficiency

In the following explanation, the computational complexity of the proposed set operation generation approach will be compared to traditional computational geometry approaches to prove the efficiencies gained by the latter. When set operations are performed on two regions possessing significantly different sizes, the computational efficiency improvement over traditional computational geometry approaches is on the order of the number of boundary cells associated with the larger of the two regions. Because this number can be quite large, the potential reduction in computational requirements permits the implementation of a wide range of demanding applications that heretofore have been impractical.

Traditional computational geometry approaches to polygon intersection between two simply-connected regions are known to possess computational complexity of order m×n (where m is the number of tuples in one region and n is the number of tuples in the other region). Thus, for even moderately large values of m and n, computational requirements tend to be quite high.

FIG. 30 is a graphical illustration of two regions exhibiting (a) limited boundary cell overlap and (b) two regions exhibiting extensive edge overlap.

When only a relatively small percentage of the boundary cells of the two regions intersect (as in FIG. 30(*a*)), the computational requirements of the present approach tends to be rather modest. The worst-case conditions occur when the two regions are of approximately equal physical size and possess significant overlap (see FIG. 30(*b*)). In this case, most, if not all, the boundary cells of the two regions interact. Thus, unlike traditional set operation generation approaches that tend to be somewhat independent of either the detailed character of the regions or their degree of overlap, the computational complexity of the quadtree-indexed vector based approach is highly sensitive to both considerations. Even the worst case performance can be orders of magnitude better than traditional computational geometry approaches. The number of tuples associated with the quadtree boundary cells for two regions will be defined as $m_i$ and $n_j$, respectively. Thus, $m=\Sigma m_i$ and $n=\Sigma n_j$ where $i=1, 2, \ldots, I$ and $j=1, 2, \ldots, J$. The "worst case" computational complexity of the boundary cell set operation generation method is therefore of order $\Sigma(m_i \times n_j) = (m_1 \times n_1) + (m_2 \times n_2) + (m_3 \times n_3) + \ldots$. By rewriting the computational complexity of the conventional computational geometry approach we find:

$$m \times n = (m_1 + m_2 + m_3 + \ldots) \times (n_1 + n_2 + n_3 + \ldots) =$$

$$(m_1 \times n_1) + (m_2 \times n_2) \times (m_3 \times n_3) \ldots + (m_1 \times n_2) + (m_1 \times n_3) + (m_2 \times n_1) \times (m_2 \times n_3) + \ldots$$

The computational requirements for the computational geometry approach is seen to involve a large number of cross-product terms not present in the proposed approach. As a consequence, the computational requirements associated with the new approach tend to be considerably less than that of traditional formulations. In addition, because the summation $(m_i \times n_j)$ need only be performed over those cells whose boundary cells are shared between the two regions, as stated above, the actual computational complexity will, in general, be considerably less than the worst case analysis predicts.

To simplify the derivation, we will assume that all boundary cells contain a uniform number of tuples (i.e., $m_i=m/I$ and $n_j=n/J$ for region 1 and region 2, respectively). Based on the worst-case node (cell) count theorem, it can be assumed that the number of interior and boundary quadtree indexing cells of each region are approximately equal. Thus, region 1 will be represented by I interior and I boundary cells; likewise, region 2 will be represented by J interior cells and J boundary cells. In addition, with no loss of generality, we assume that $m=n$. Based on these assumptions and using the search-based approach for evaluating cell interactions (the region with the lowest cell count controls the number of required operations), the worst case computational complexity for the three classes of cell intersection are as follows:

(interior, interior)cell=$I$ (interior, boundary)cell=$I$ (boundary, boundary)cell=$I \times (m/I \times n/J) = (m \times n)/J$ The latter expression arises because, for each boundary cell in the physically smaller of the two regions, all possible line segment intersections between, the piecewise continuous line segments associated with two features must be computed.

Because $I << m < n$, it becomes readily apparent that $(m \times n)/J >> I$. Thus, the (boundary, boundary) component of the computation (sub problem 3) dominates the complexity of the present approach. Therefore, the computational complexity of the present approach is on the order of $(m \times n)/J$ and the "worst case" relative efficiency (with respect to a computational geometry-based approach), $E_R$, is:

$$E_R = (m \times n)/(m \times n)/J = J = n/n_j$$

In other words, the relative efficiency of the present approach with respect to the conventional computational geometry approach is equal to the number of indexing cells in the larger of the two regions (i.e., J). Equivalently, the relative efficiency is proportional to the number of tuples in the larger of the two regions (i.e., n). As the "size" of the larger region increases, so does the relative efficiency. If the number of points in the larger region is increased by two orders of magnitude, for instance, the relative efficiency will increase by approximately that same proportion.

When little overlap exists between the two regions (such as in FIG. 30(a)), the number of boundary cells (and their associated tuples) is much less than I. Consequently, overall performance will be better than the above performance bound predicts.

The "worst-case" performance of the present approach occurs when all boundary cells of the two regions intersect. In this situation, $I=J$ and $n_j$ can be replaced by $n/I$. Under these conditions, the "worst-case." performance improvement reduces to $$E_R = n/n_j = n/(n/I) = I$$

As a simple example, suppose $I=100$. Thus, the "worst case" relative efficiency improvement over traditional computational geometry algorithms is on the order of 100 (i.e., $I=100$). If the indexing cell size was further refined so that both regions contained 1000 boundary cells (i.e., $I=1000$), the present approach could be as much as one thousand times more efficient than traditional computational geometry-based intersection algorithms.

Performance tests conducted using the software implementation of the generation methodology corroborate these theoretically derived performance bounds.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A method for locating a geographical region using a digital computer, where the located region is the result of a Boolean operation among a first geographical region and a second geographical region, where the regions are represented as vector tuples, the method comprising:

establishing indexing cells about the regions;

classifying each indexing cell by the type of interaction between the regions, where the type of interaction includes (boundary, boundary), a (boundary, boundary) indexing cell containing a portion of the boundary of each region;

for each (boundary, boundary) indexing cell:

defining a pseudo-point at each entrance of each region boundary to the cell and each exit from the cell of each region boundary;

categorizing the (boundary, boundary) indexing cell based on a relationship of its pseudo-points;

identifying at least one starting point along the boundary of one of the regions based on:

the categorization, a Boolean operation to be performed, and the interior convention of the vector tuples representation;

accumulating result tuples, including tuples including pseudo points and intersections between region boundaries, encountered in tracing a cycle: from a first at least one starting point, along the first starting point region boundary; in the direction of the first starting point region boundary; and returning to the first starting point, wherein:

upon encountering each intersection the cycle proceeds along the other region boundary, in the direction of the other region boundary, upon encountering a cell edge the cycle proceeds along the cell edge in the direction consistent with the interior convention of the vector tuple representation, and until the cycle is completed at the first starting point;

upon completing a cycle where at least one of a starting point remains untraversed or an intersection between region boundaries remains untraversed, accumulating result tuples, including tuples including pseudo points and intersections between region boundaries, encountered in tracing a cycle: from a subsequent starting point at the first untraversed starting point or untraversed intersection between region boundaries along the subsequent starting point region boundary, in the direction of the subsequent starting point region boundary, and returning to the subsequent starting point, wherein:

upon encountering each intersection the cycle proceeds along the other region boundary, in the direction of the other region boundary, upon encountering a cell edge the cycle proceeds along the cell edge in the direction consistent with the interior convention of the vector tuple representation, and until the cycle is completed at the subsequent starting point;

discarding duplicate tuples and tuples comprising only cell edges, until all starting points and intersections of the region boundaries have been traversed, and displaying the located region as defined at least in part by the accumulated result tuples.

2. The method of claim 1 wherein establishing indexing cells about the regions comprises:

establishing indexing cells such that each (boundary, boundary) indexing cell contains no more than one entry and one exit of the boundary of each region.

3. The method of claim 2 where categorizing each (boundary, boundary) indexing cell based on a relationship of its pseudo-points further comprises:

categorizing each (boundary, boundary) indexing cell as one of the following based on the order of pseudo points encountered in a counterclockwise traverse of the (boundary, boundary) indexing cell boundary:

first region entry ($1e$), first region exit ($1x$), second region entry ($2e$), second region exit ($2x$)—(i.e., Category 1);

$1e$, $2x$, $2e$, $1x$—(Category 2);

$1e$, $2e$, $2x$, $1x$—(Category 3);

$1e$, $1x$, $2x$, $2e$—(Category 4);

$1e$, $2x$, $1x$, $2e$—(Category 5); and $1e$, $2e$, $1x$, $2x$—(Category 6).

4. The method of claim 3 wherein identifying at least one starting point along the boundary of at least one region based on categorization, the Boolean operation, and the interior convention used in the quadtree-indexed vector tuples representation further comprises:

where the convention is "inside to the right" and at least one intersection between boundaries exists in the (boundary, boundary) indexing cell:

where the Boolean operation is intersection:

for Category 1 identifying the starting point as the first intersection between region boundaries, for Category 2 identifying the starting point as $2e$ and $1e$, for Category 3 identifying the starting point as $2e$, for Category 4 identifying the starting point as $1e$, for Category 5 identifying the starting point as $1e$, for Category 6 identifying the starting point as $2e$;

where the Boolean operation is union:

for Category 1 identifying the starting point as $2e$ and $1e$, for Category 2 identifying the starting point as the first intersection between region boundaries, for Category 3 identifying the starting point as $1e$, for Category 4 identifying the starting point as $1e$, for Category 5 identifying the starting point as $2e$, for Category 6 identifying the starting point as $2e$;

where the convention is "inside to the left" and at least one intersection point between boundaries exists in the (boundary, boundary) indexing cell:

where the Boolean operation is intersection:

for Category 1 identifying the starting point as $2e$ and $1e$ for Category 2 identifying the starting point as the first intersection between region boundaries, for Category 3 identifying the starting point as $1e$, for Category 4 identifying the starting point as $1e$, for Category 5 identifying the starting point as $2e$, and for Category 6 identifying the starting point as $2e$; and where the Boolean operation is union:

for Category 1 identifying the starting point as the first intersection between region boundaries, for Category 2 identifying the starting point as $2e$ and $1e$, for Category 3 identifying the starting point as $2e$, for Category 4 identifying the starting point as $2e$, for Category 5 identifying the starting point as $1e$, and for Category 6 identifying the starting point as $1e$.

5. The method of claim 1 wherein, accumulating tuples further comprises:

excluding tuples representing indexing cell boundary segments but including tuples representing pseudo points and intersections between the region boundaries.

6. A computer program product for locating a geographical region as a product of a Boolean operation between a first geographical region and a second geographical region, where the regions and the result of the operation are represented as region quadtree-indexed vector tuples, the computer program product comprising:

a computer readable medium;

an indexing module stored on the medium and operable for:

establishing indexing cells about the regions a classifying module stored on the medium and operable for:

classifying each indexing cell by the type of interaction between the regions, where the type of interaction includes (boundary, boundary), a (boundary, boundary) indexing cell containing a portion of the boundary of each region;

a definition module stored on the medium and operable for:

defining a pseudo-point at each entrance of each region boundary to the cell and each exit from the cell of each region boundary in each (boundary, boundary) indexing cell;

a categorization module stored on the medium and operable for:

categorizing the (boundary, boundary) indexing cell based on a relationship of its pseudo-points;

an identification module stored on the medium and operable for:

identifying at least one starting point along the boundary of one of the regions for each (boundary, boundary) indexing cell based on:

the categorization,
the Boolean operation, and
the interior convention of the vector tuples representation;
an accumulation module stored on the medium and operable, for each (boundary, boundary) indexing cell, for:
accumulating result tuples, including tuples including pseudo points and intersections between region boundaries, encountered in tracing a cycle: from a first at least one starting point, along the first starting point region boundary; in the direction of the first starting point region boundary; and returning to the first starting point, wherein:
upon encountering each intersection the cycle proceeds along the other region boundary, in the direction of the other region boundary; and
upon encountering a cell edge the cycle proceeds along the cell edge in the direction consistent with the interior convention of the vector tuple representation;
until the cycle is completed at the first starting point;
upon completing a cycle where at least one of a starting point remains untraversed or an intersection between region boundaries remains untraversed, accumulating result tuples, including tuples including pseudo points and intersections between region boundaries, encountered in tracing a cycle: from a subsequent starting point at the first untraversed starting point or untraversed intersection between region boundaries along the subsequent starting point region boundary, in the direction of the subsequent starting point region boundary, and returning to the subsequent starting point, wherein:
upon encountering each intersection the cycle proceeds along the other region boundary, in the direction of the other region boundary, and
upon encountering a cell edge the cycle proceeds along the cell edge in the direction consistent with the interior convention of the vector tuple representation;
until the cycle is completed at the subsequent starting point, and
discarding duplicate tuples and tuples comprising only cell edges, until all starting points and intersections of the region boundaries have been traversed, and
a display module stored on the medium and operable, for each (boundary, boundary) indexing cell, for
displaying the located region as defined at least in part by the accumulated result tuples.

7. The computer program product of claim 6 wherein establishing indexing cells about the regions comprises:
establishing indexing cells such that each (boundary, boundary) indexing cell contains no more than one entry and one exit of the boundary of each region.

8. The computer program product of claim 7 where categorizing each two-region boundary indexing cell based on a relationship of its pseudo-points further comprises:
categorizing each (boundary, boundary) indexing cell as one of the following based on the order of pseudo points encountered in a counterclockwise traverse of the (boundary, boundary) indexing cell boundary:

first region entry (1e), first region exit (1x), second region entry (2e), second region exit (2x)—(i.e., Category 1);
1e, 2x, 2e, 1x—(Category 2);
1e, 2e, 2x, 1x—(Category 3);
1e, 1x, 2x, 2e—(Category 4);
1e, 2x, 1x, 2e—(Category 5); and
1e, 2e, 1x, 2x—(Category 6).

9. The computer program product of claim 8 wherein identifying a starting point along the boundary of at least one region based on categorization, the Boolean operation, and the interior convention used in the quadtree-indexed vector tuples representation further comprises:
where the convention is "inside to the right" and at least one intersection between boundaries exists in the (boundary, boundary) indexing cell:
where the Boolean operation is intersection:
for Category 1 identifying the starting point as the first intersection between region boundaries,
for Category 2 identifying the starting point as 2e and 1e,
for Category 3 identifying the starting point as 2e,
for Category 4 identifying the starting point as 1e,
for Category 5 identifying the starting point as 1e,
for Category 6 identifying the starting point as 2e;
where the Boolean operation is union:
for Category 1 identifying the starting point as 2e and 1e,
for Category 2 identifying the starting point as the first intersection between region boundaries,
for Category 3 identifying the starting point as 1e,
for Category 4 identifying the starting point as 1e,
for Category 5 identifying the starting point as 2e,
for Category 6 identifying the starting point as 2e;
where the convention is "inside to the left" and at least one intersection point between boundaries exists in the (boundary, boundary) indexing cell:
where the Boolean operation is intersection:
for Category 1 identifying the starting point as 2e and 1e
for Category 2 identifying the starting point as the first intersection between region boundaries,
for Category 3 identifying the starting point as 1e,
for Category 4 identifying the starting point as 1e,
for Category 5 identifying the starting point as 2e, and
for Category 6 identifying the starting point as 2e; and
where the Boolean operation is union:
for Category 1 identifying the starting point as the first intersection between region boundaries,
for Category 2 identifying the starting point as 2e and 1e,
for Category 3 identifying the starting point as 2e,
for Category 4 identifying the starting point as 2e,
for Category 5 identifying the starting point as 1e, and
for Category 6 identifying the starting point as 1e.

10. The computer program product of claim 7 wherein, accumulating tuples further comprises:
excluding tuples representing indexing cell boundary segments but including tuples representing pseudo points and intersections between the region boundaries.

* * * * *